United States Patent
Tauchi et al.

(12)

(10) Patent No.: US 6,305,873 B1
(45) Date of Patent: Oct. 23, 2001

(54) JOINTING CONSTRUCTION

(75) Inventors: Eiji Tauchi; Akihiko Nakano; Kenta Matsubara; Hiroki Someya; Shuuichi Nishimura; Susumu Okayama, all of Tokyo; Toshio Kobayashi, Fujinomiya, all of (JP)

(73) Assignees: Obayashi Corporation, Osaka; Ishikawajima Construction Materials, Co., Ltd., Tokyo, both of (JP)

( * ) Notice: Subject to any disclaimer, the term of this patent is extended or adjusted under 35 U.S.C. 154(b) by 0 days.

(21) Appl. No.: 09/297,551

(22) PCT Filed: Apr. 28, 1997

(86) PCT No.: PCT/JP97/01473

§ 371 Date: May 3, 1999

§ 102(e) Date: May 3, 1999

(87) PCT Pub. No.: WO98/22694

PCT Pub. Date: May 28, 1998

(30) Foreign Application Priority Data

Nov. 18, 1996 (JP) .................................................. 8-306826
Nov. 18, 1996 (JP) .................................................. 8-306827
Feb. 3, 1997 (JP) .................................................. 9-020793

(51) Int. Cl.[7] ............................. B25G 3/20; F16B 2/14; F16B 2/18; F16B 7/04
(52) U.S. Cl. ................. 403/374.1; 403/320; 403/374.3; 403/381
(58) Field of Search ............................... 403/374.1, 374.2, 403/374.5, 381, 374.3, 315, 320, 314; 29/DIG. 18, 34 R; 405/134, 135, 153

(56) References Cited

U.S. PATENT DOCUMENTS

| 3,055,463 | * | 9/1962 | Lutz ........................................ 189/36 |
| 4,830,536 | * | 5/1989 | Birch et al. ........................... 405/153 |
| 5,226,302 | * | 7/1993 | Anderson ............................... 70/159 |
| 5,393,165 | * | 2/1995 | Rowan, Jr. ............................ 403/301 |
| 5,594,977 | * | 1/1997 | McCallion ........................... 24/136 B |
| 6,076,995 | * | 6/2000 | Tauchi et al. ........................ 405/153 |

FOREIGN PATENT DOCUMENTS

| 6-146794 | 5/1994 | (JP) . |
| 8-189299 | 7/1996 | (JP) . |

OTHER PUBLICATIONS

Patent Abstracts of Japan, Publication No. 06–146794 A, Published May 27, 1994.
Patent Abstracts of Japan, Publication No. 08–296396A, Published Nov. 12, 1996.

\* cited by examiner

Primary Examiner—Lynne H. Browne
Assistant Examiner—John B. Walsh
(74) Attorney, Agent, or Firm—Fish & Richardson P.C.

(57) ABSTRACT

Structural members 1, 21 are connected by way of a connecting rod 3 which is attached to one structural member 1 and projects outward from connecting surface 2 of structural member 1 in the direction of other structural member 21, and a connector 23 which is attached to other structural member 21 and has a plurality of wedges 25 which engage with connecting rod 3 stopping it so that it cannot slip out. Connecting rod 3 is attached so as to be moveable in a direction parallel to connecting surface 2.

8 Claims, 16 Drawing Sheets

FIG. 11A  FIG. 11B
FIG. 11C
FIG. 11D   FIG. 11F
FIG. 11E   FIG. 11G
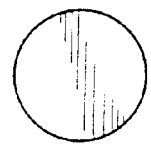
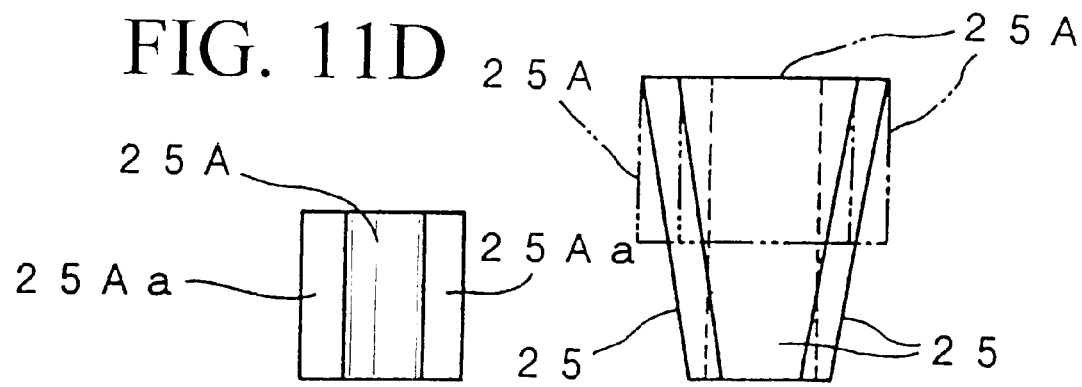
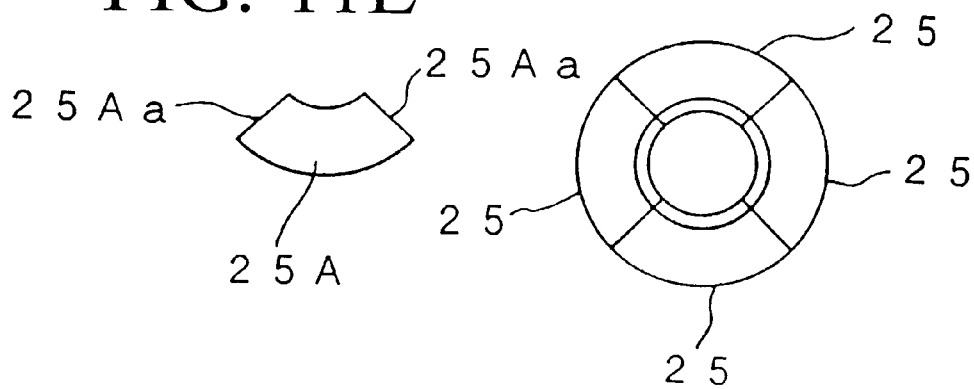

JOINTING CONSTRUCTION

BACKGROUND OF THE INVENTION

1. Field of the Invention

The present invention relates to a connecting structure in which structural elements such as segments are connected together, a plurality of these structural elements being connected together to form a cylindrical tunnel wall member, for example.

2. Technical Field of the Invention

When forming tunnel wall members, a typical structure employed for the segment connecting structure is one in which a joint plate having a hole is recessed in the vicinity of the segment's connecting surface. The connecting surfaces of the segments are brought into contact with one another, with the joint plate holes aligned so as to communicate. A bolt is then passed through the communicating holes in this state, and a nut is fastened on to the bolt to affect the connection.

However, the above structure requires that the extremely troublesome operation of passing the bolt through the holes formed in the connecting surfaces of the joint plates, and then fastening a nut over the bolt, be performed at the construction site.

Moreover, in the above-described structure, fastening of the nut onto the bolt becomes difficult if there is even a slight positional deviation between the segments. As a result, work may be delayed.

DISCLOSURE OF THE INVENTION

The present invention's connecting structure is one in which the structural members are connected with their connecting surfaces mutually aligned. The present invention's connecting structure is connected by means of a connecting rod attached to one structural member and projecting outward from its connecting surface in the direction of another structural member, and a connector attached to the other structural member which engages with this connecting rod. This connector is provided with a tapered sleeve, the diameter of its inner circumferential surface gradually widening in the direction of insertion of the connecting rod; a plurality of wedges which are disposed in a circle within the sleeve to form an insertion fixing hole for the connecting rod at their mutual center, the plurality of wedges being disposed so as to be freely moveable in the longitudinal direction of the sleeve, with the outer circumferential surfaces of the wedges in contact with the inner circumferential surface of the sleeve; and an elastic member for biasing the wedges toward the rear of the direction of insertion of the connecting rod.

In the case where connecting structural members using this connecting structure, the wedges retreat toward the bottom of the sleeve, compressing the elastic member, when the connecting rod is pushed into the sleeve of the connector. The diameter of the insertion fixing hole formed by the wedges widens, and the connecting rod is inserted into the insertion fixing hole. Once the insertion of the connecting rod into the insertion fixing hole is completed, the wedges are pushed toward the tip of the sleeve due to the biasing force of the elastic member. As a result, the diameter of the insertion fixing hole formed by the wedges is reduced, so that the connecting rod is gripped and fixed in place. The diameter of the insertion fixing hole formed by the wedges narrows further in response to a slipping out movement by the connecting rod, so that the fixing force of the wedges is increased. As a result, the connecting rod is strongly connected by the connector, thus connecting the structural members in a unitary manner.

The method for producing the wedges employed in the present invention is one in which wedges are produced for a connector that is provided with a tapered sleeve, the inner circumferential surface of which has a gradually widening diameter in the direction of insertion of the connecting rod; a plurality of wedges that are disposed in a circle within the sleeve to form an insertion fixing hole at their mutual center, this plurality of wedges being disposed so as to be freely moveable along the longitudinal direction of the sleeve with their outer circumferential surfaces in contact with the inner circumferential surface of the sleeve; and an elastic member for biasing the wedges toward the rear direction of insertion of the connecting rod which is inserted into the insertion fixing hole. In this method, a plurality of intermediate work pieces, which are flabellate in cross-section, are produced and then placed in a forging machine disposed in a circle with their lateral surfaces facing one another. These intermediate work pieces are then simultaneously forge-molded into wedges by the forging machine, to produce the wedges which form the connector.

This method for producing the wedges does not require an operation for segmenting a wedge-shaped cylinder by cutting. Accordingly, the wedges can be produced at low cost. Moreover, accuracy in assembling a plurality of these wedges is excellent. Further, since no machining allowance for cutting is incurred, a reduction in wedge width and a decrease in the contact surface with the sleeve does not occur. As a result, strong fastening can be obtained, while at the same time, small diameter wedges can be produced. In addition, since the fiber flow generated during forge-molding is not interrupted, strong wedges can be obtained. The machining equipment can also be reduced in size. Productivity is increased, with defective products less likely to be produced. As a result, the wedges can be produced even more inexpensively.

In the attaching structure for the connector in the present invention, the connector is attached to a mold-plate using an attaching member, the connector being provided with a tapered sleeve, the inner circumferential surface of which has a gradually widening diameter in the direction of insertion of the connecting rod; a plurality of wedges that are disposed in a circle within the sleeve to form an insertion fixing hole at their mutual center, this plurality of wedges being disposed so as to be freely moveable along the longitudinal direction of the sleeve with their outer circumferential surfaces in contact with the inner circumferential surface of the sleeve; and an elastic member for biasing the wedges toward the rear of the direction of insertion of the connecting rod which is inserted into the insertion fixing hole. The attaching member is equipped with a cylindrical pin which passes through the attachment hole formed in the mold-plate, to insert into and engage with the insertion fixing hole of the connector disposed at the inner surface of the mold-plate; a stopping member provided to the cylindrical pin, which is stopped by the outer surface of the mold-plate; an elastically deformable elastic member which is provided to the end of the cylindrical pin on its connector side; an attachment bolt which passes through the elastic member and the cylindrical pin, the head of which is stopped by the elastic member; and an attachment nut which screws onto the end of the attachment bolt which projects outward from the end of the cylindrical pin. By screwing on the attachment nut of the attaching member, the elastic member is compressed and its diameter expands, attaching the connector to the mold-plate.

In this attaching structure for the connector, the elastic member and the cylindrical pin of the attaching member are passed through the attachment hole of the mold-plate and inserted into the connector. Then, by the simple operation of fastening the attachment nut, the elastic member is compressed, so that its diameter expands. As a result, the attaching member and the connector form a unitary structure, thereby attaching the connector to the mold-plate. Thus, a quicker and simpler attachment operation can be anticipated.

It is necessary to release the connection between the connector and mold-plate when removing the mold. In this case, by loosening the attachment nut, the pressing force of the head portion of the attachment bolt on the elastic member is released. As a result, the elastic member returns to its original form, releasing the engagement between the connector and the attaching member. As a result, the connection between the connector and the mold-plate is released. Accordingly, removal of the connector from the mold-plate can also be carried out easily and quickly.

In the attaching structure for the connector in the present invention, the attaching member is provided with an engaging member which is inserted into and engages with an attachment hole in the mold-plate; a stopping member which is provided to the engaging member and is stopped by the outer surface of the mold-plate; a plurality of wide-diameter pieces which are disposed in opposition to one another at the open end of the inner circumferential wall of the sleeve of the connector, sandwiching the axis of the sleeve therebetween; a biasing means for biasing this plurality of wide-diameter pieces toward the axis; a wide-diameter piece manipulating member provided with a tapered surface disposed in between the plurality of wide-diameter pieces for mutually separating the plurality of wide-diameter pieces accompanying relative movement toward the attachment hole, and mutually bringing together the wide-diameter pieces under the biasing force of the biasing means accompanying relative movement in the opposite direction, and an interlocking member for interlocking with the wide-diameter pieces when they have been brought mutually close together and moving them in the opposite direction; an attachment bolt which passes through the wide-diameter piece manipulating member, the engaging member and the stopping member, the head portion of which is stopped by the wide-diameter piece manipulating member; and an attachment nut which screws onto the end of the attachment bolt which projects outward from the stopping member. The attaching structure for the connector in the present invention attaches the connector to the mold-plate by screwing on the attachment nut to the attaching member, so that the wide-diameter pieces are compressed in the outer circumferential direction by the wide-diameter piece manipulating member.

In this attaching structure for the connector, the attachment of the connector to the mold-plate can be carried out by means of the simple operation of inserting the wide-diameter pieces and the wide-diameter piece manipulating member into the connector via the attachment hole of the mold-plate, and fastening the attachment nut. As a result, a faster and easier attachment operation can be anticipated.

It is necessary to release the connection between the connector and mold-plate when removing the mold. In this case, by loosening the attachment nut, the pressing force of the wide-diameter piece manipulating member on the wide-diameter pieces can be released.

In this way, the wide-diameter pieces are brought mutually close together by the biasing means, so that the engagement between the connector and attaching member is released. Moreover, as a result, the connection between the connector and the mold-plate is also released. Accordingly, the release of the connector from the mold-plate can also be carried out easily and quickly. In other words, by employing this attaching member, it is possible to easily and quickly form a structural member to which a connector is provided.

In addition, in the attaching structure of the connector in the present invention, a retainer having a screw hole is provided in between the wedges and the elastic member of the connector, with the screw hole communicating with the insertion fixing hole. In this attaching structure, the connector is attached to the mold-plate by inserting the attachment bolt which has been inserted through the attachment hole of the mold-plate into the insertion fixing hole, and screwing the attachment bolt into the screw hole of the retainer.

In the attaching structure for the connector in the present invention, a retainer is provided in between the wedges and the elastic member of the connector, this retainer being provided with a nut having a screw hole. The attachment bolt inserted through the attachment hole of the mold-plate is inserted into the insertion fixing hole, and screwed into the screw hole of the nut. In this way, the connector is attached to the mold-plate.

In these attaching structures for connectors, the attachment bolt is inserted into the connector by passing through the attachment hole of the mold-plate. The attachment of the connector to the mold-plate can then be carried out by means of the simple operation of screwing the attachment bolt into the screw hole formed in the retainer or, alternatively, the screw hole of the nut. Thus, a simpler and quicker attaching operation can be anticipated. Moreover, releasing can be carried out simply by loosening the attachment bolt from the retainer screw hole or the nut screw hole. As a result, the release of the connector can also be carried out quickly and easily. In other words, the formation of a structural member in which a connector is provided can be performed easily and quickly.

BRIEF DESCRIPTION OF THE FIGURES

FIG. 11 is a production process diagram for explaining the production method for the wedges employed in the connector.

PREFERRED EMBODIMENTS OF THE PRESENT INVENTION

Preferred embodiments of the present invention will now be explained with reference to the accompanying figures.

These embodiments employ as an example a structural member consisting of the segments forming a tunnel wall element. The structure for connecting these structural members will be explained.

Figure 1:
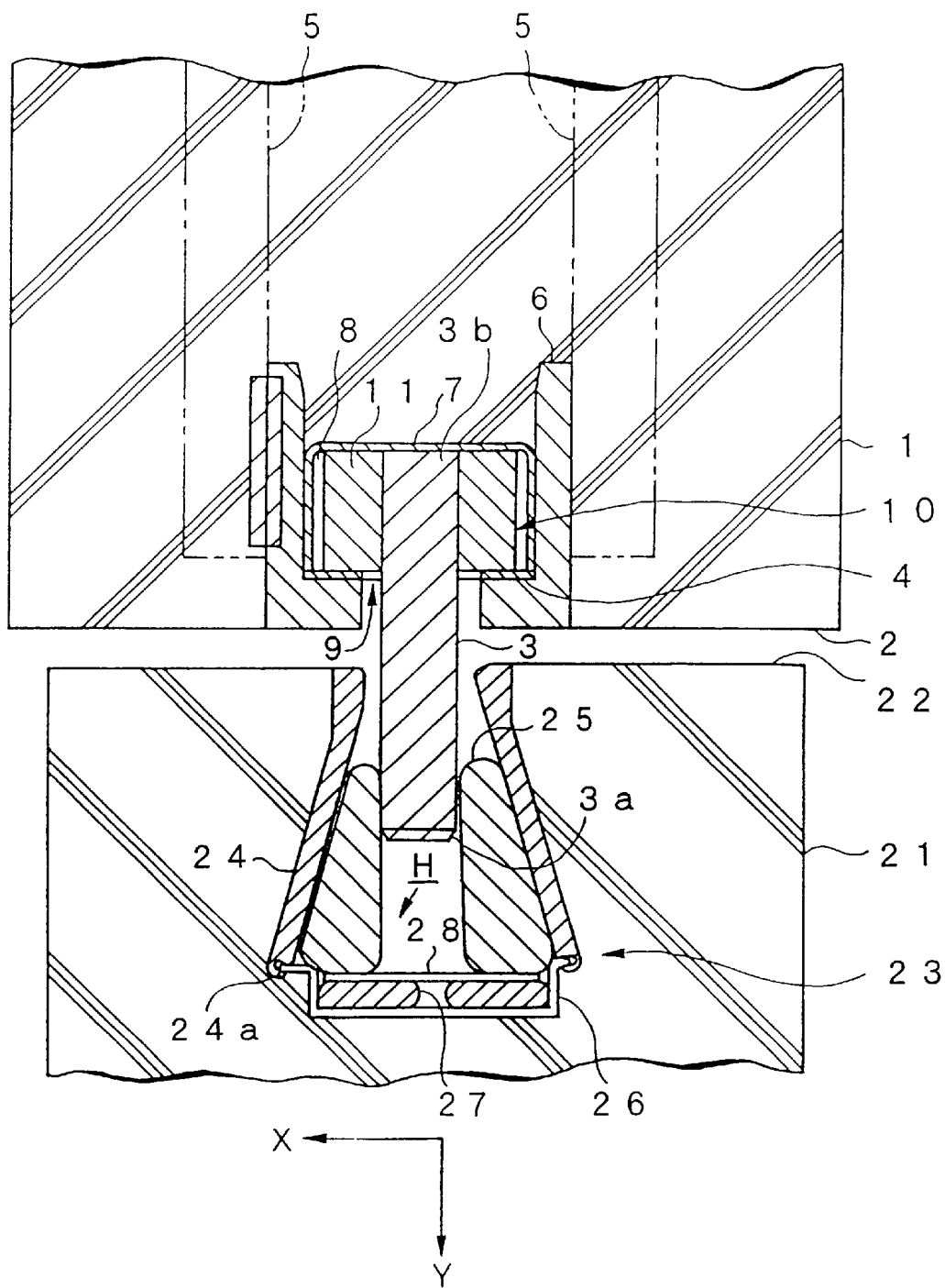
FIG. 1 is a cross-sectional view for explaining the present invention's connecting structure, showing the connection site of the structural member.

As shown in FIG. 1, a connecting rod 3 projecting outward from the connecting surface 2 of structural member 1 is attached inside structural member 1, which consists of one segment.

Figure 2:
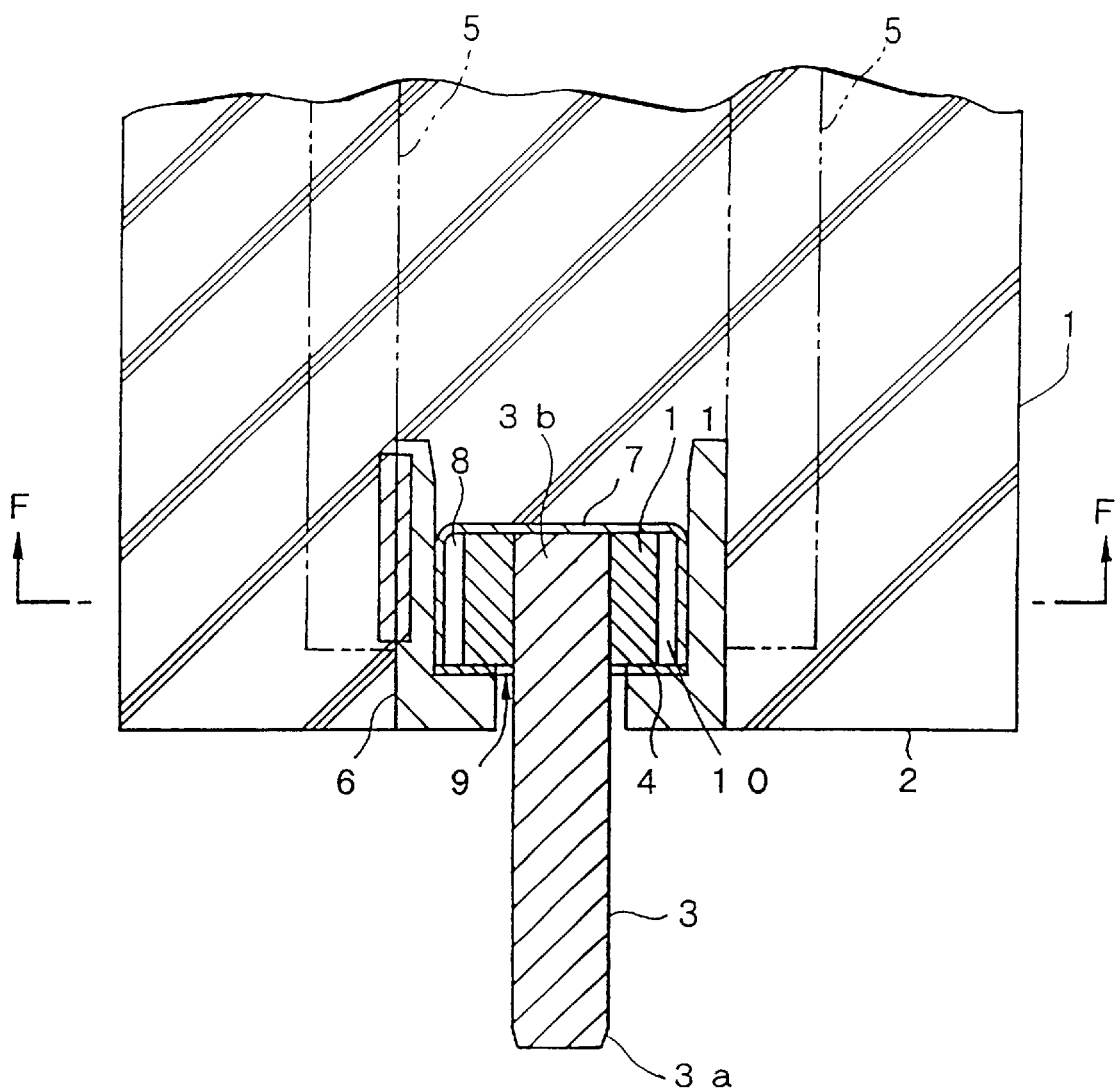
FIG. 2 is a cross-sectional view for explaining the structure of the connecting rod, showing the portion of a structural member in which the connecting rod is provided.

As shown in FIG. 2, the end 3a of connecting rod 3 is tapered so that its diameter gradually reduces in the direction of the tip.

Supporting plate 4 is embedded inside structural member 1 parallel to connecting surface 2. This supporting plate 4 is fixed in place by fixing member 6 which itself is fixed to structural member 1 by anchor 5. Housing case 7 is attached to the rear surface of supporting plate 4. This housing case 7 is embedded in structural member 1 and forms a housing space 8. Opening 9 is formed in supporting plate 4 opening in the forward direction of connecting surface 2.

Base end 3b of connecting rod 3 is disposed inside housing space 8 by insertion through opening 9. Head portion 10 is provided to base end 3b for engaging with supporting plate 4. This head portion 10 attaches nut 11 to base end 3b of connecting rod 3. Head portion 10 is formed to have a larger diameter than opening 9.

Figure 3:
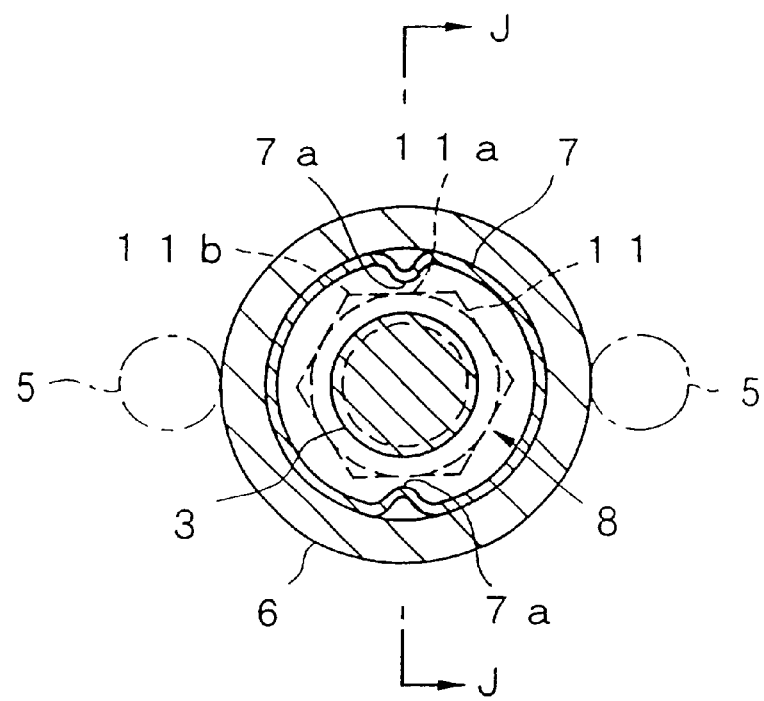
FIG. 3 is a cross-sectional view along the F—F line in FIG. 2 for explaining the structure of the connecting rod.
Figure 4:
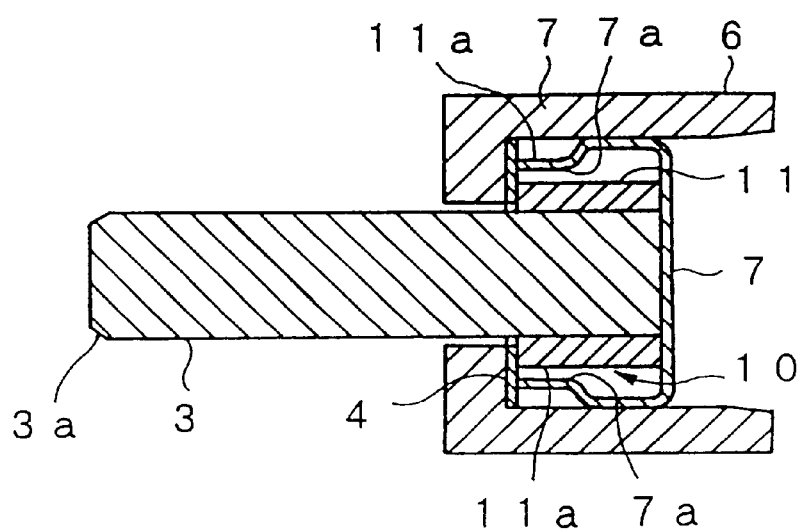
FIG. 4 is a cross-sectional view along the J—J line in FIG. 3 for explaining the structure of the connecting rod.

As shown in FIGS. 3 and 4, housing case 7 which forms housing space 8 has indentations 7a where the inner circumferential diameter of housing case 7 is reduced. The space between indentation 7a and near part 11a of nut 11 is approximately 2 mm. A space is also present between the inner wall of housing case 7 and corner 11b of nut 11, with this dimension set so as to be approximately equal to the space between indentation 7a and near part 11a of nut 11.

In contrast, there is almost no space between nut 11, and supporting plate 4 and housing case 7.

In one structural member 1 having this structure, head portion 10 of connecting rod 3 is formed to have a diameter larger than opening 9. As a result, connecting rod 3 does not slip out toward the front of connecting surface 2.

There is a space between head portion 10 of connecting rod 3 and housing case 7. As a result, head portion 10 can move within housing space 8 in a direction parallel to connecting surface 2 (in the direction indicated by X in FIG. 1, or in a direction opposite thereto) within the limits of specific dimensions corresponding to the aforementioned space. Accordingly, connecting rod 3 itself, which projects outward from opening 9, can move in a direction parallel to connecting surface 2 within connecting surface 2 of structural member 1.

Next, the structure of structural member 21 consisting of another segment which connects with structural member 1 will be explained.

Connector 23 is provided to other structural member 21 inside connecting surface 22. Connector 23 has a sleeve 24 which is formed to taper in the direction opposite that indicated by Y shown in FIG. 1. A plurality of wedges 25 are disposed in a ring within sleeve 24 to a form an insertion fixing hole H at their center through which connecting rod 3 is inserted. Furthermore, the plurality of wedges 25 are disposed so as to be freely moveable in the longitudinal direction of sleeve 24 with their outer circumferential surfaces in contact with the inner circumferential surface of sleeve 24. A spring holding member (urethane case) 26 is attached at the rear of the large diameter end of sleeve 24 by means of a bent portion 24a. Urethane spring 27 is housed inside spring holding member 26 as an elastic member for biasing wedges 25 toward the small diameter end of sleeve 24 so that the diameter of insertion fixing hole H is reduced. Numeric symbol 28 indicates a retainer for partitioning wedges 25 and urethane spring 27.

The function of this connecting structure will now be explained. When connecting structural members 1,21, connecting rod 3 is pushed into sleeve 24 of connector 23 by moving one structural member 1 in the Y direction, causing wedges 25 to compress urethane spring 27. Wedges 25 retreat toward the bottom (in the Y direction in the figure) of sleeve 24, and the diameter of insertion fixing hole H formed by wedges 25 narrows. In this way, connecting rod 3 is inserted into this insertion fixing hole H.

Once insertion of connecting rod 3 into insertion fixing hole H is completed, wedges 25 are pushed toward the tip (in the opposite direction of Y) of sleeve 24 by the biasing force of urethane spring 27. As a result, the diameter of insertion fixing hole H formed by these wedges 25 is reduced, so that connecting rod 3 is gripped and fixed in place.

In response to a slipping out movement by connecting rod 3, the diameter of the insertion fixing hole H formed by wedges 25 becomes still smaller, thereby increasing its fixing force. As a result, connecting rod 3 is strongly connected to connector 23, so that structural members 1,21 are connected in a unitary manner.

Figure 5:
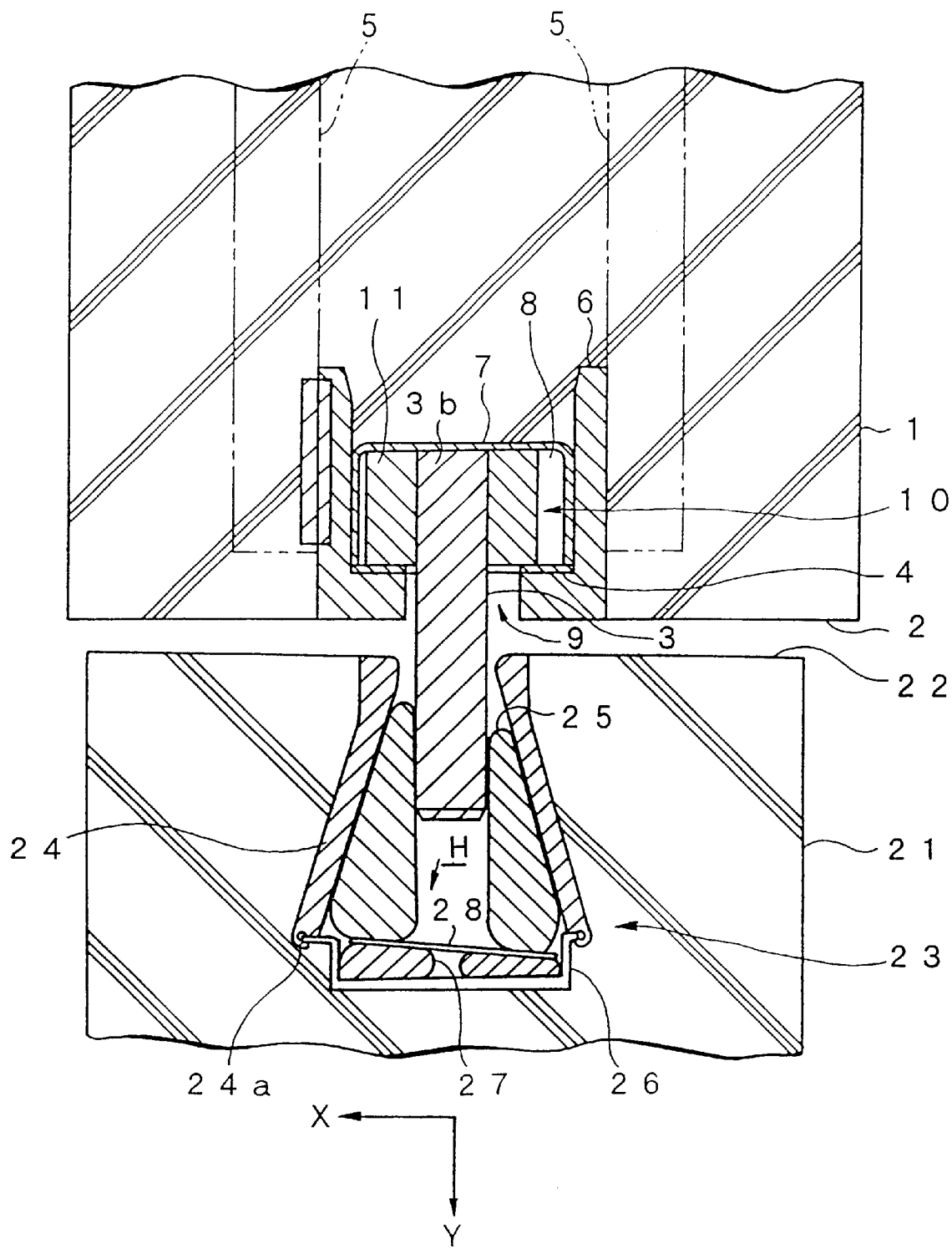
FIG. 5 is a cross-sectional view for explaining the state of connection between structural members, showing the connection site on the structural member.

When connecting structural members 1,21 in the example shown in FIG. 1, the axes of connecting rod 3 and connector 23 coincide with one another in the connecting action—what might be called an "ideal connection action". However, actual connection of structural members 1,21 is not limited absolutely to a state in which the axes of connecting rod 3 and connector 23 coincide. Rather, as shown in FIG. 5, it is frequently the case that connecting rod 3 and connector 23 enter the connecting action with their axes deviating in the X direction for example, i.e., an eccentric insertion.

Accordingly, in the actual steps to connect structural members 1,21, a structure is desirable in which structural members 1,21 can be connected even in the case of this type of eccentric insertion.

In the above-described connecting structure, the amount by which wedges 25 retreat can be increased by making the urethane spring 27 thicker on the connector 23 side. As a result, even in the case of an eccentric insertion, connection of structural members 1,21 by means of engagement between connecting rod 3 and connector 23 is possible. In other words, in the case where connecting rod 3 is inserted with its axis directed eccentrically in the X direction with respect to the axis of connector 23, connecting rod 3 pushes wedges 25 in the X direction. Wedges 25 pushed by connecting rod 3 retreat greatly in the Y direction, compressing urethane spring 27 more strongly in the Y direction. As a result, axial deviation is permitted in the case of an eccentric insertion.

Note that the size of spring holding member 26 increases as urethane spring 27 is made thicker. Accordingly, this leads to an increase in the size and cost of the connecting structure.

On the other hand, when urethane spring 27 is made thin, the amount by which wedges 25 retreat inside connector 23 when connecting rod 3 has been inserted into connector 23 is reduced. As a result, less eccentricity is permitted in the insertion of connecting rod 3.

In the above-described connecting structure, eccentric deviation is permitted by connector 23. In structural member 1, connecting rod 3 is pushed in the X direction by wedges 25, so that head portion 10 inside housing space 8 moves in the X direction. Accompanying this, connecting rod 3 itself also moves in the X direction. As a result, structural members 1,21 can be connected with a greater degree of axial deviation permitted between connecting rod 3 and connector 23.

Thus, in the above-described connecting structure for structural members 1,21, it is possible to respond to an eccentric insertion from both the connector 23 side and the connecting rod 3 side. When inserting connecting rod 3, it is possible to respond to an even greater degree of eccentricity. Thus, it is possible to connect structural members 1,21 with ease and certainty.

Furthermore, even if urethane spring 27 is made thin in this connecting structure, compensation therefore can be accomplished on the connecting rod 3 side. As a result, urethane spring 27 can be made thin, enabling a reduction in the side of connector 23.

In the above-described connecting structure, urethane spring 27 is held inside spring holding member 26 of connector 23 as a elastic member. However, the elastic member is not limited to urethane spring 27.

Namely, other springs or elastic elements such as rubber may be used in place of urethane spring 27 as the elastic member, to the same effect.

Figure 6:
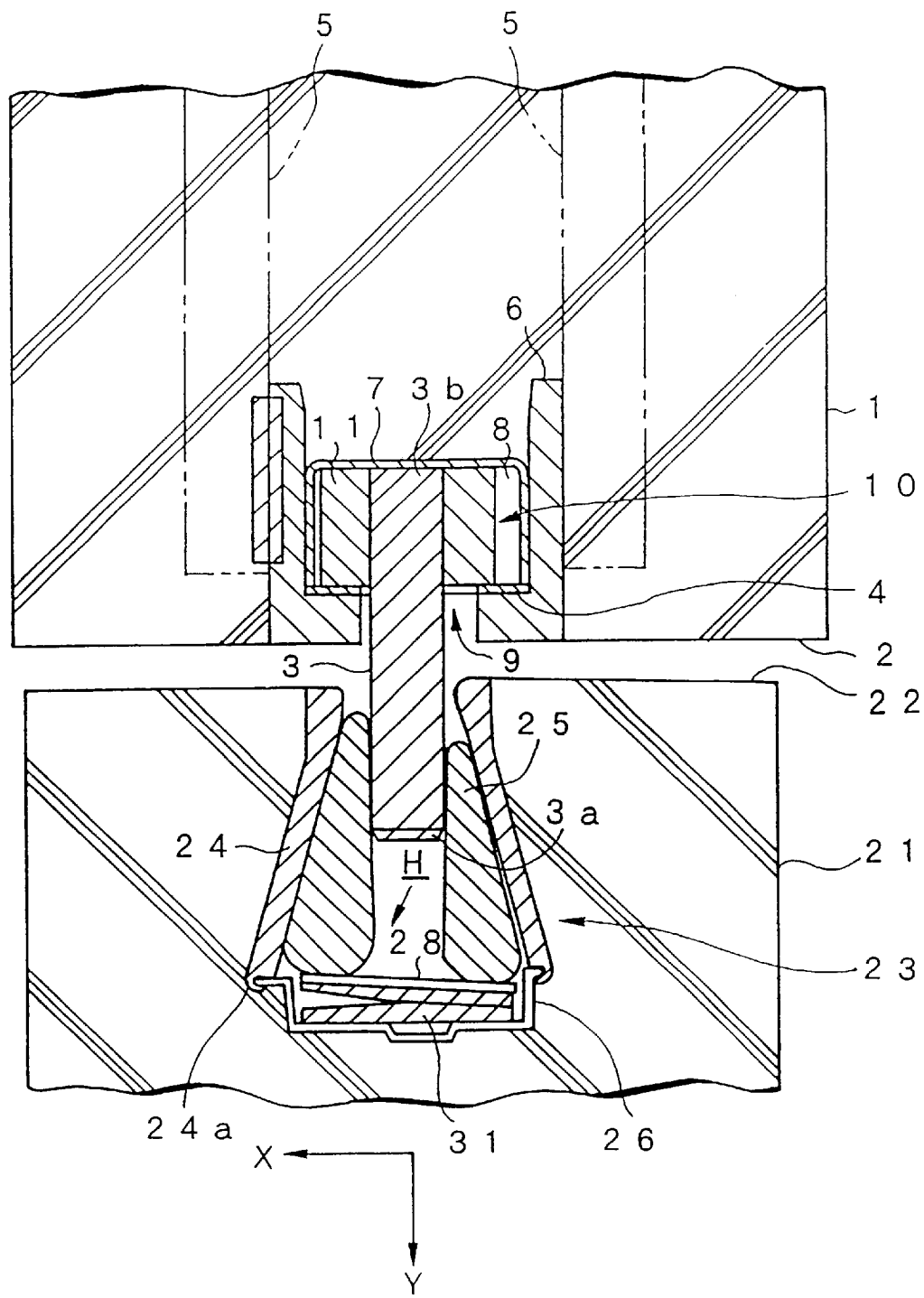
FIG. 6 is a cross-sectional view for explaining the connecting structure employing a connector of another design, showing the connection site on the structural member.

The arrangement shown in FIG. 6 employs a belleville spring 31 as the elastic member used in connector 23.

This example also has the same effect as in the case of the connecting structure discussed above. Namely, even if a thin belleville spring 31 is employed as an elastic member, deviation of structural members 1,21 can be permitted with surety.

Figure 7:
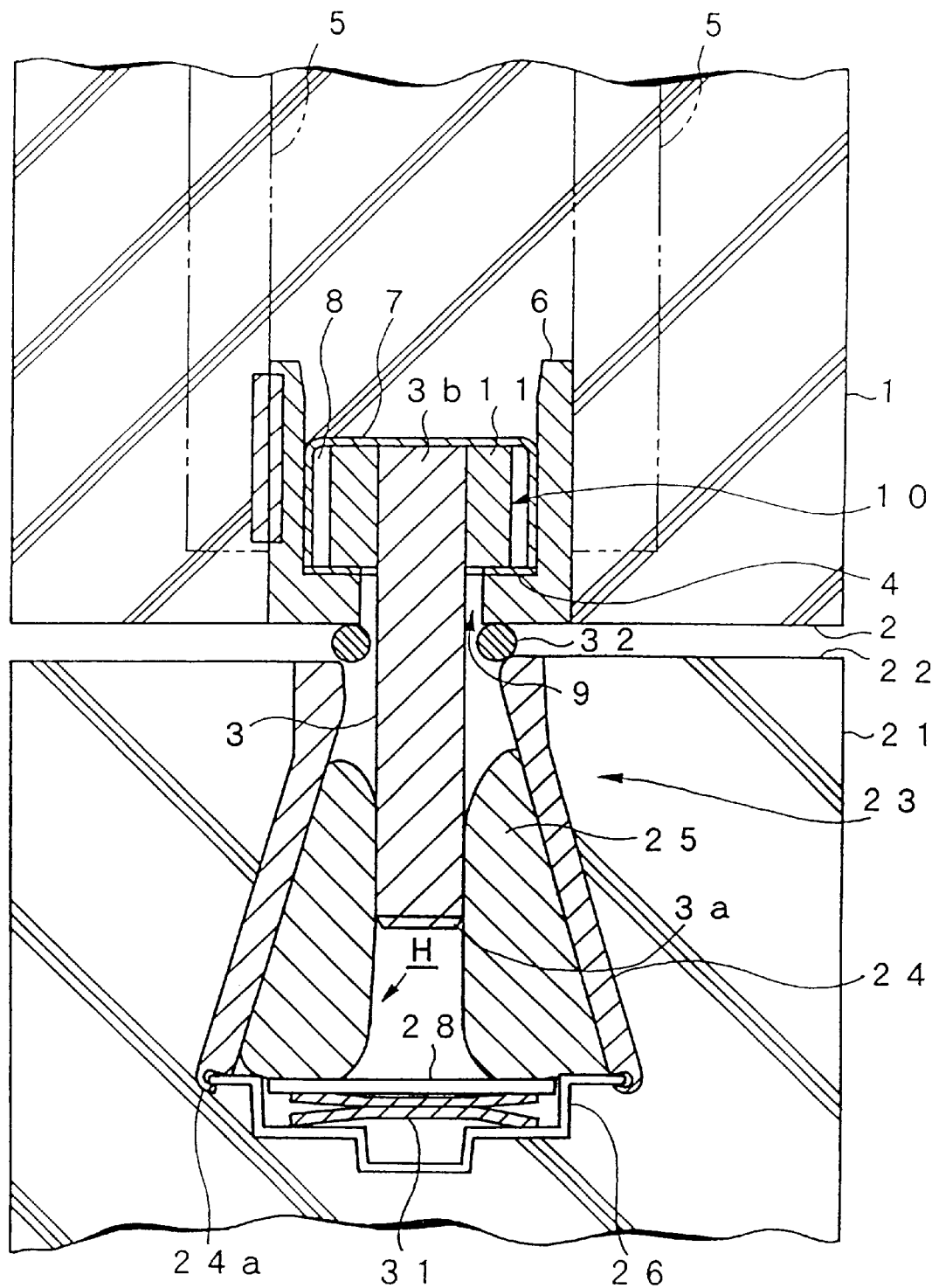
FIG. 7 is a cross-sectional view for explaining the connecting structure employing a connector of another design, showing the connection site on the structural member.

Next, the second embodiment of the present invention will now be explained with reference to FIGS. 7 and 8.

The connecting structure according to the second embodiment differs from that of the first embodiment in the provision of a sealing member (O ring) 32 in the vicinity of connecting rod 3 of one structural member 1.

When connecting one structural member 1 and another structural member 21 in this type of connecting structure, sealing member 32 is compressed by connecting surfaces 2,22 of structural members 1,21. As shown in FIG. 8, sealing member 32 enters into sleeve 24, sealing the interval of space between the inner circumferential surface at the sleeve 24 entrance and the outer circumferential surface of connecting rod 3. As a result, intrusion of water into connector 23 is prevented.

Accordingly, for example, even if water leakage occurs inside the tunnel in which structural members 1,21 have been disposed, water does not enter connector 23, so that internal corrosion does not readily occur.

Figure 8:
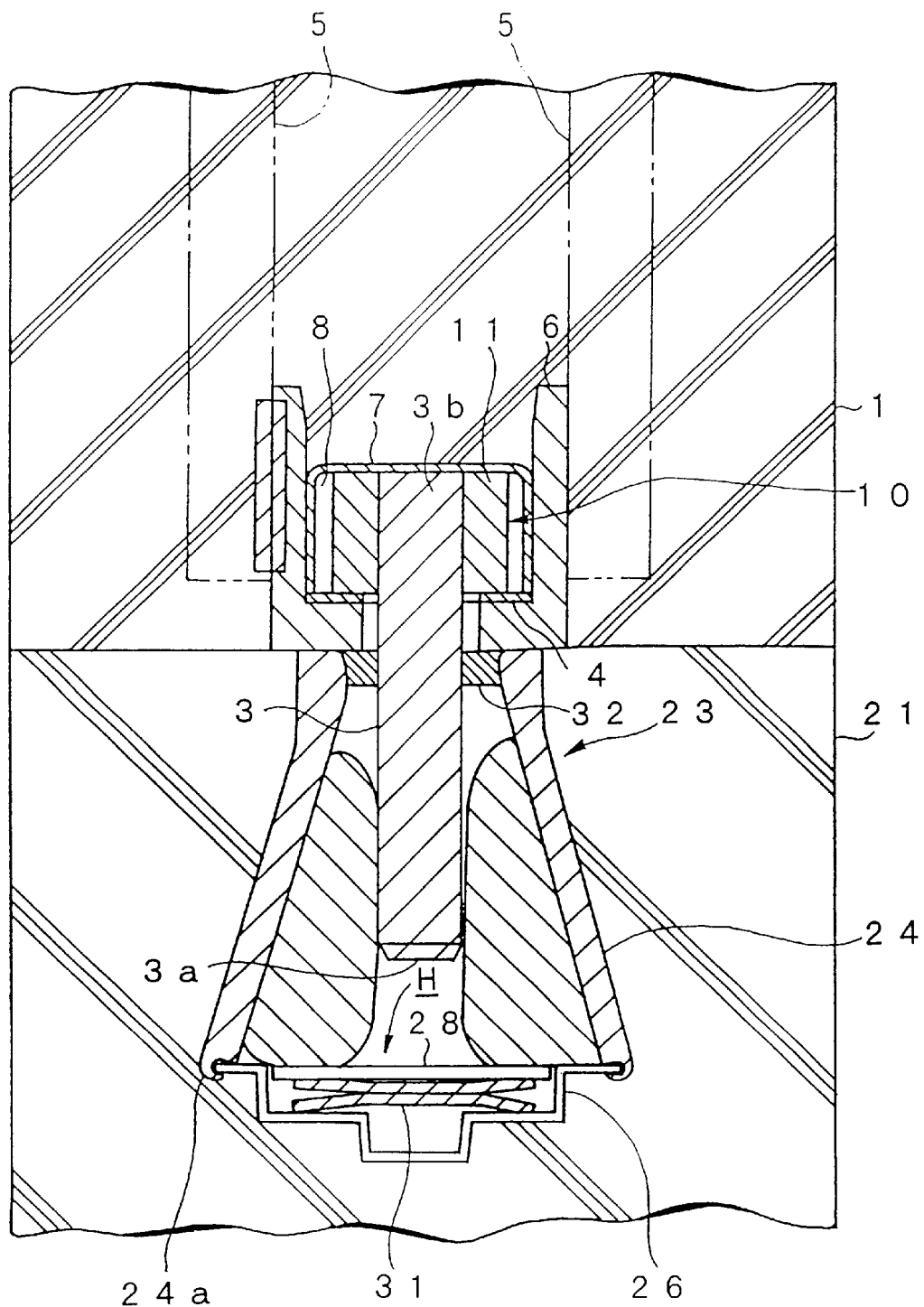
FIG. 8 is a cross-sectional view for explaining the state of connection of structural members employing a connector of another design, showing the connection site on the structural member.

In addition, note that, as shown in FIG. 8, when there is a space between connecting rod 3 and fixing member 6, sealing member 32 also seals this space. As a result, sealing member 32 also functions to prevent intrusion of water into housing case 7.

Figure 9:
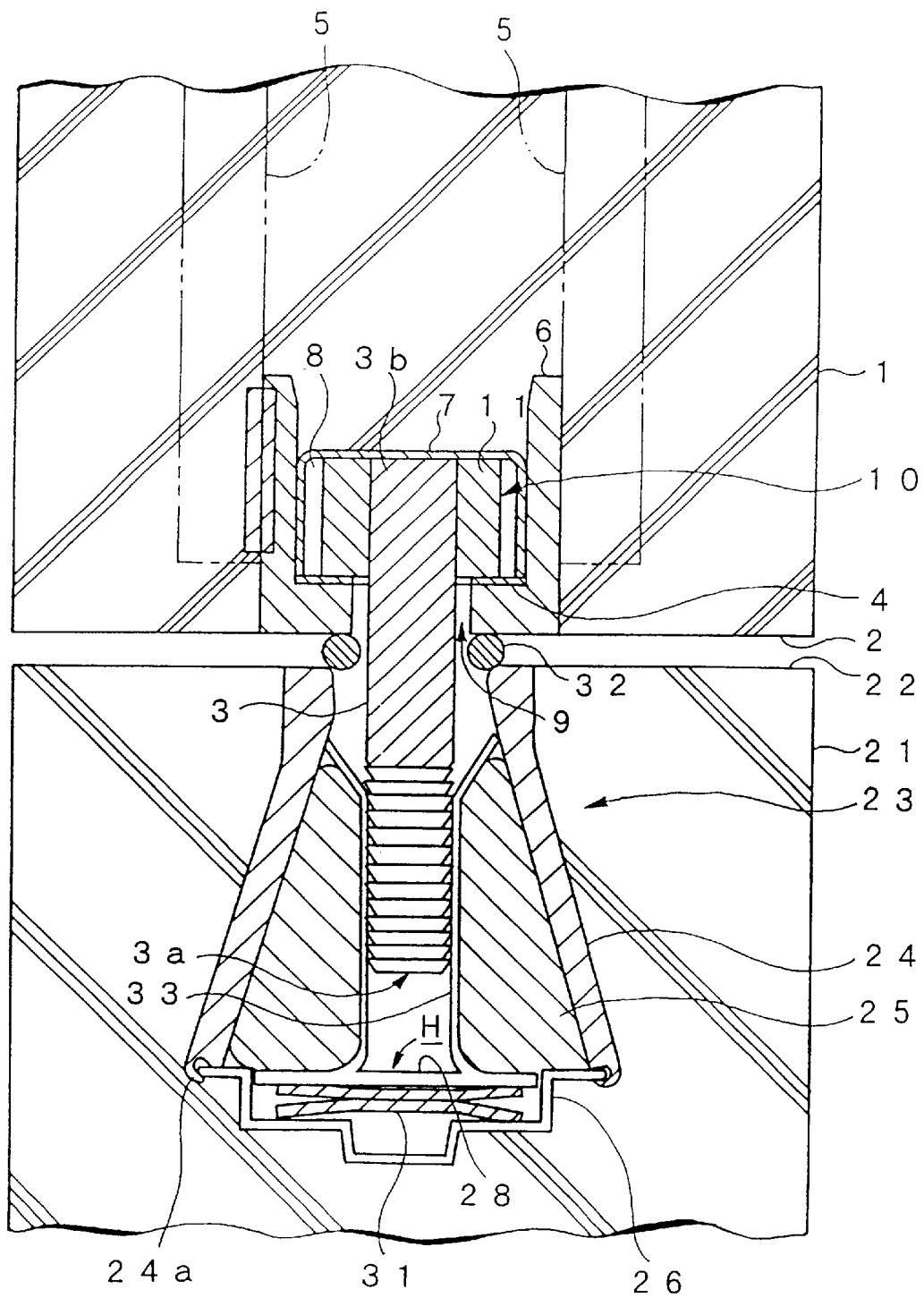
FIG. 9 is a cross-sectional view for explaining the connecting structure employing a connector of another design, showing the connection site on the structural member.
Figure 10:
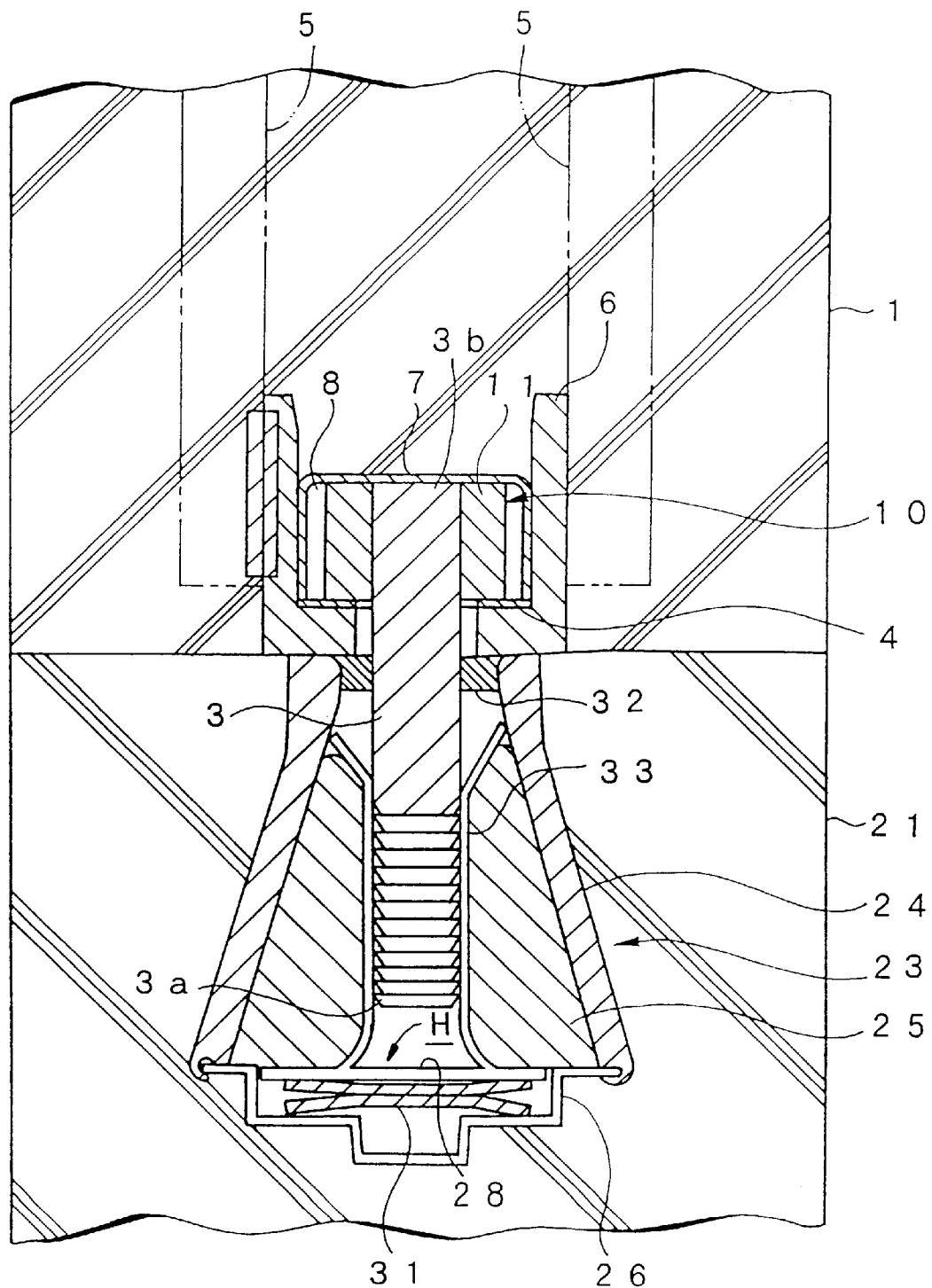
FIG. 10 is a cross-sectional view for explaining the state of connection of structural members employing a connector of another design, showing the connection site on the structural member.

The third embodiment will now be explained with reference to FIGS. 9 and 10.

The connecting structure in this third embodiment differs from that shown in the second embodiment in that the area of connecting rod 3 near its tip 3a has the form of a saw-blade in cross-section, as shown in the figure. In addition, another point of difference is the provision of a metallic plate 33 formed in a unitary manner with retainer 28 at the inner circumferential surface of wedges 25.

Because the area of connecting rod 3 at its tip 3a has this saw-blade form in cross-section, once structural members 1,21 are connected, even if there is a force working in a direction which would separate and pull apart the two members, the outer circumferential surface of connecting rod 3 with this saw-blade form in cross-section is interlocked with the inner circumferential surfaces of wedges 25. As a result, frictional force increases, so that structural members 1,21 are not easily separated. Thus, a more strongly fixed connection between structural members 1,21 is enabled. In addition, even though the outer circumferential surface near tip 3a of connecting rod 3 has a saw-blade form in cross section, the inner circumferential surfaces of wedges 25 are reinforced by metallic plate 33. As a result, the strength of wedges 25 is ensured, while the inner circumferential surface thereof is protected.

This embodiment is equivalent to the first and second embodiments with respect to there being sufficient allowance for axial deviation between connecting rod 3 and connector 23 even when belleville spring 31 is made thin.

In this third embodiment, the area at tip 3a of connecting rod 3 is formed into a saw-blade in cross-section. At the same time, however, the inner circumferential surface of wedges 25 or metallic plate 33 may be formed so as to interlock with the saw-blade form of connecting rod 3, thereby enabling an even stronger connecting force between structural members 1,21.

The method for making wedges 25 of connector 23 that are employed in the above-described connecting structure will now be explained.

Figure 12:
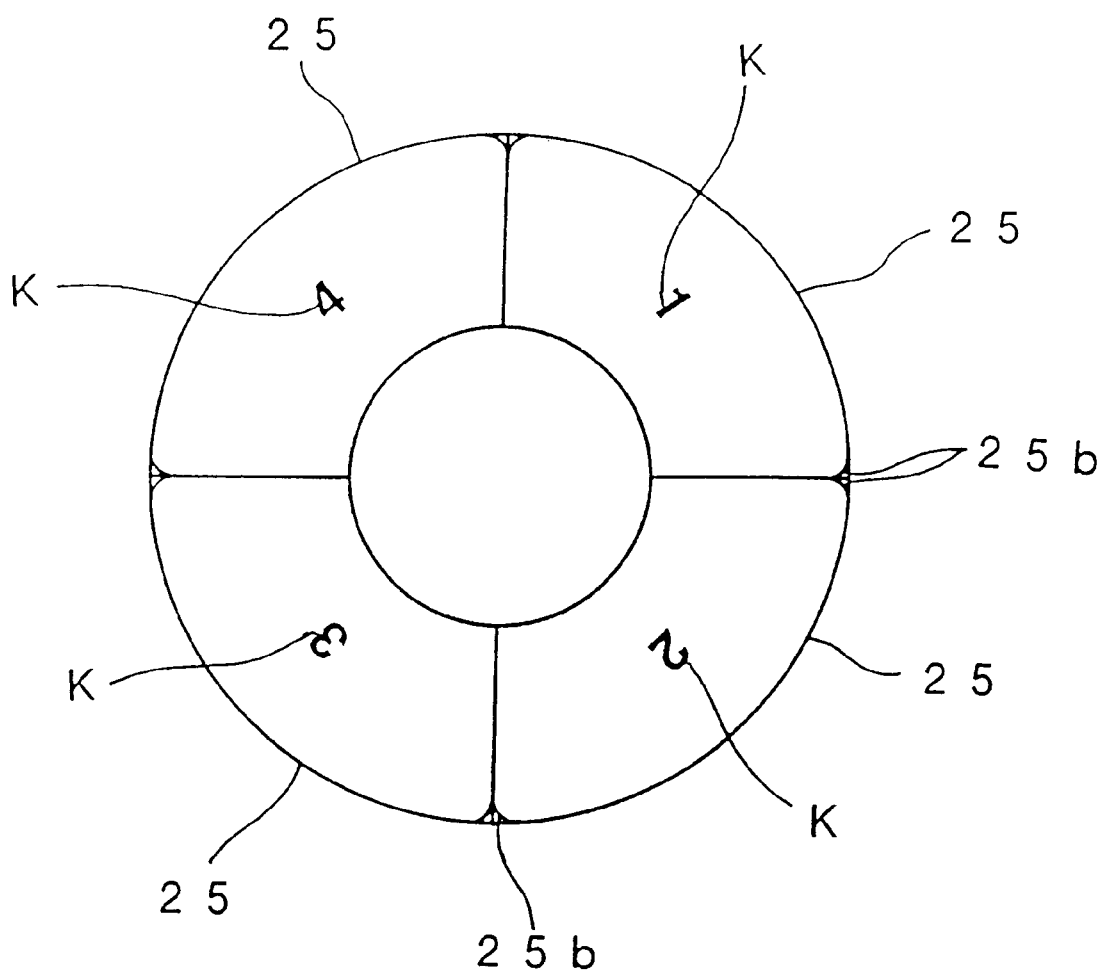
FIG. 12 is a planar view of the wedges employed in the connector.
Figure 13:
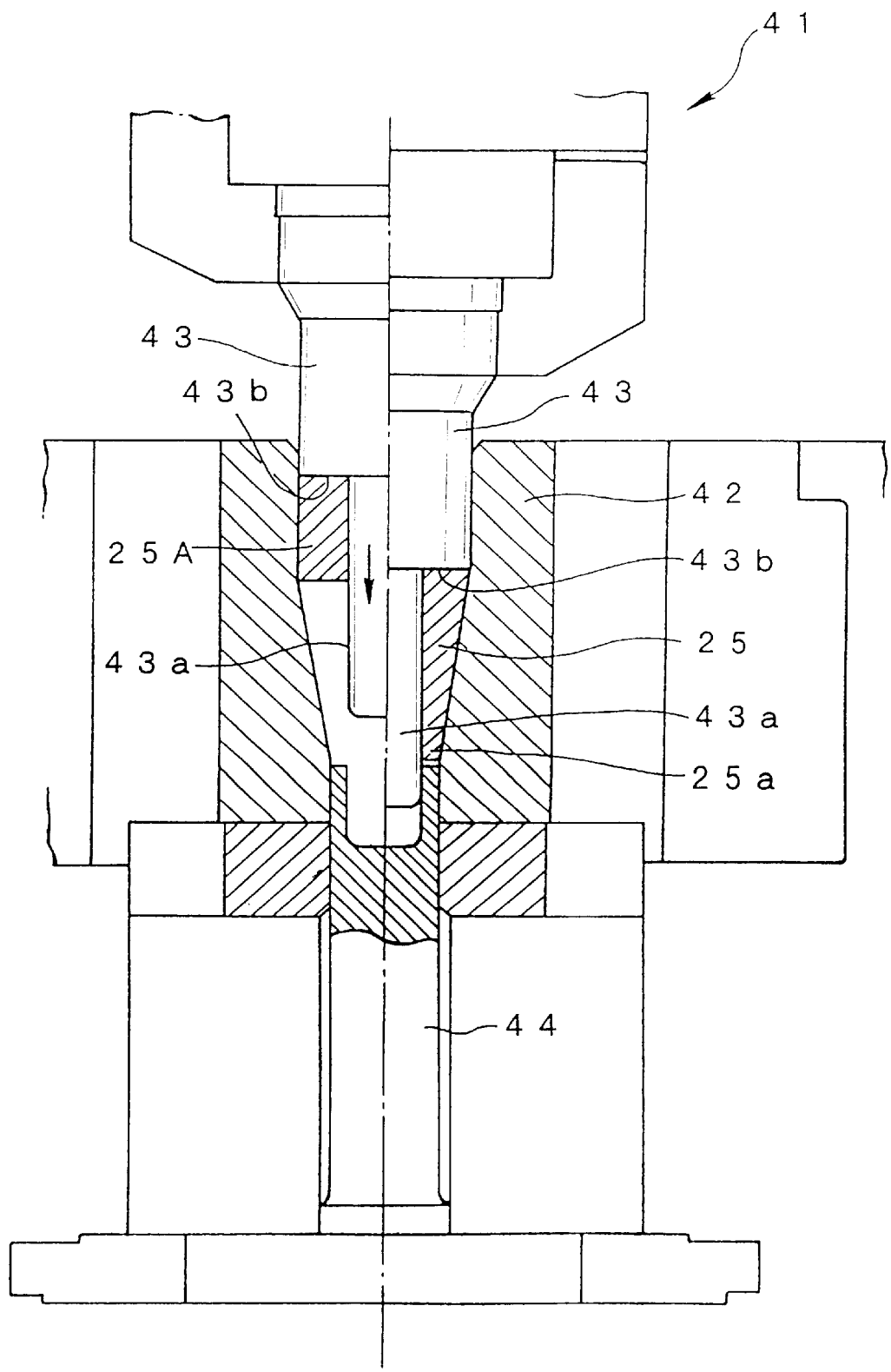
FIG. 13 is a cross-sectional view of the forging machine for explaining the process for producing the wedges.

FIGS. 11~13 show examples of methods for making wedges 25 of connector 23.

These wedges 25 are formed via the steps of cutting a circular plate from a steel or other metallic round rod in a mechanical process using a milling machine or a sawing machine as shown in FIGS. 11(*a*), (*b*), and (*c*); subjecting the circular plate to bonderizing; forming the circular plate into an intermediate product 25 such as shown in FIGS. 11 (*d*) and (*e*) that is flabellate in cross-section by cold forging; and disposing inside forging machine 41 a plurality (four here) of the thus-formed intermediate products 25A in a circle so that their lateral sides 25Aa face one another, and forging this plurality of intermediate products 25A simultaneously into wedges under the operation of forging machine 41.

Note that in FIG. 11, (*c*) is a view of the bottom surface of (*b*), (*e*) is a view of the bottom surface of (*d*), and (*g*) is a view of the bottom surface of (*f*).

Forging machine 41 is provided with a lower dice 42, upper punch 43 and notch out pin 44, and is designed to simultaneously cold forge the plurality of intermediate products 25A (see left half of FIG. 13) which have been placed in a circle around axis 43*a* of upper punch 43 into wedges 25 by lowering upper punch 43 with respect to lower dice 42. A stamp is attached to the pressing surface 43*b* of upper punch 43 for stamping the end surface on the large diameter side of each wedge 25 during forge-molding with a symbol or a graphic character, such as K, (hereinafter, "symbol") showing the alignment of the plurality of wedges 25. The stamp may be convex or concave. Typically, however, it is convex (but concave in the case of symbol K).

In the above example, intermediate product 25A was formed by forging. Intermediate product 25A may be formed by other means, such as mechanical processing, however. The method for forming intermediate product 25A is optional. Bonderizing of intermediate product 25A is carried out as necessary.

Forging machine 41 in FIG. 13 is designed to form tips 25*a* of wedges 25 into a natural form. Forging machine 41 is not limited thereto, however, but rather the design and type formed is optional.

Symbol 25*b* in FIG. 12 indicates cut-outs formed in the outer peripheral corners of the edge surface on the large diameter side of wedges 25.

In the method for forming wedges 25 in this example, a partitioning operation using a step to cut a wedge-shaped cylinder is not necessary. Accordingly, wedges 25 can be formed at low cost, with good accuracy of assembly for the plurality of wedges 25. Moreover, since there is no machine allowance for cutting incurred, no reduction in the width of wedges 25 nor decrease in the contact surface with sleeve 24 occurs. Accordingly, a strong fastening force can be obtained, while at the same time forming a small diameter wedge 25.

In addition, since the flow of fiber generated during forge-molding is not interrupted, wedges 25 having a high degree of strength can be obtained. In addition, a reduction in the size of the machining equipment can be anticipated. Productivity is improved and defective products become less likely. Accordingly, wedges 25 can be formed a lower cost.

Figure 14:
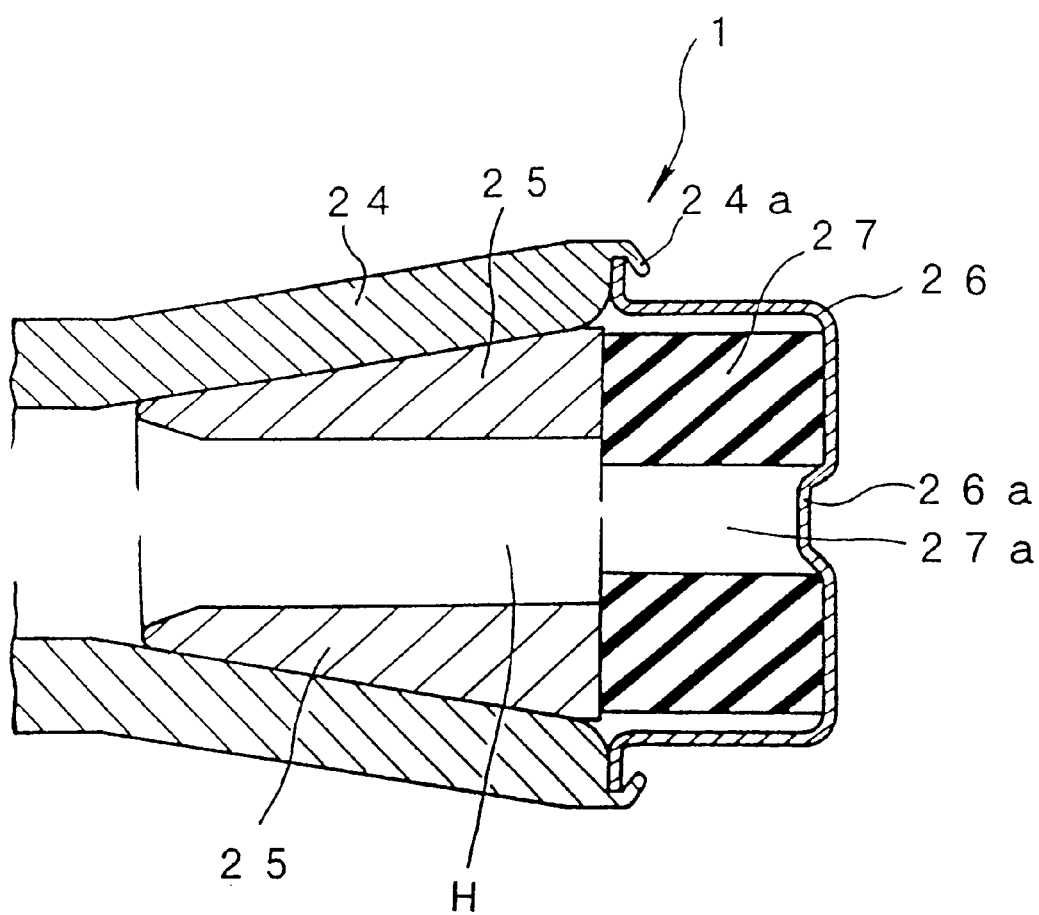
FIG. 14 is a cross-sectional view of the connector employing the wedges produced.

FIG. 14 shows an example of a connector 23 employing wedges 25 formed in the above-described production method. The production and operation of connector 23 are almost identical to that described above. Connector 23 is formed in the main of tapered sleeve 24 which is circular in cross-section; a plurality of wedges 25 which are disposed in a circle to form insertion fixing hole H of connecting rod 3 at their center, wedges 25 housed inside sleeve 24 to be freely moveable in the longitudinal direction of sleeve 24 with their outer circumferential surfaces in contact with the inner circumferential surface of sleeve 24; and cylindrical urethane spring 27 provided to the large diameter rear end of sleeve 24, biasing wedges 25 toward the small diameter tip of sleeve 24 so that the diameter of insertion fixing hole H becomes smaller. Using the K symbols, each wedge 25 is housed inside sleeve 24 in the same array as employed at the time of forge-molding. A spring holding member 26 is fixed in place by bent member 24*a* at the rear end side of sleeve 24.

The strength of spring holding member 26 is increased by the formation of projection 26*a* at the center of the bottom of spring holding member 26. In addition, projection 26*a* engages with the hole at the center of urethane spring 27 and fixes urethane spring 27 in a specific position.

In connector 23 employing wedges 25 formed by the above-described production method, not only is the accuracy of assembly of the plurality of wedges 25 excellent, but, because a machine allowance for a cutting process is not necessary, the contact area with respect to sleeve 24 is expanded by that portion. As a result, connecting rod 3 can be tightly joined, thus a strong, stable connecting force can be obtained.

The loading number (the number of wedges 25 disposed inside sleeve 24) of intermediate products 25A in forging machine 41 is not limited to 4. Rather, a loading number of 2, 3 or, depending on the circumstances, 5 or more is possible. In addition to belleville spring 31 described above, a flat spring, coil spring or the like may be used in urethane spring 27. An explanation will now be made of the case where connector 23 is supported by a mold-plate during production of structural member 21 having a connector 23.

Figure 15:
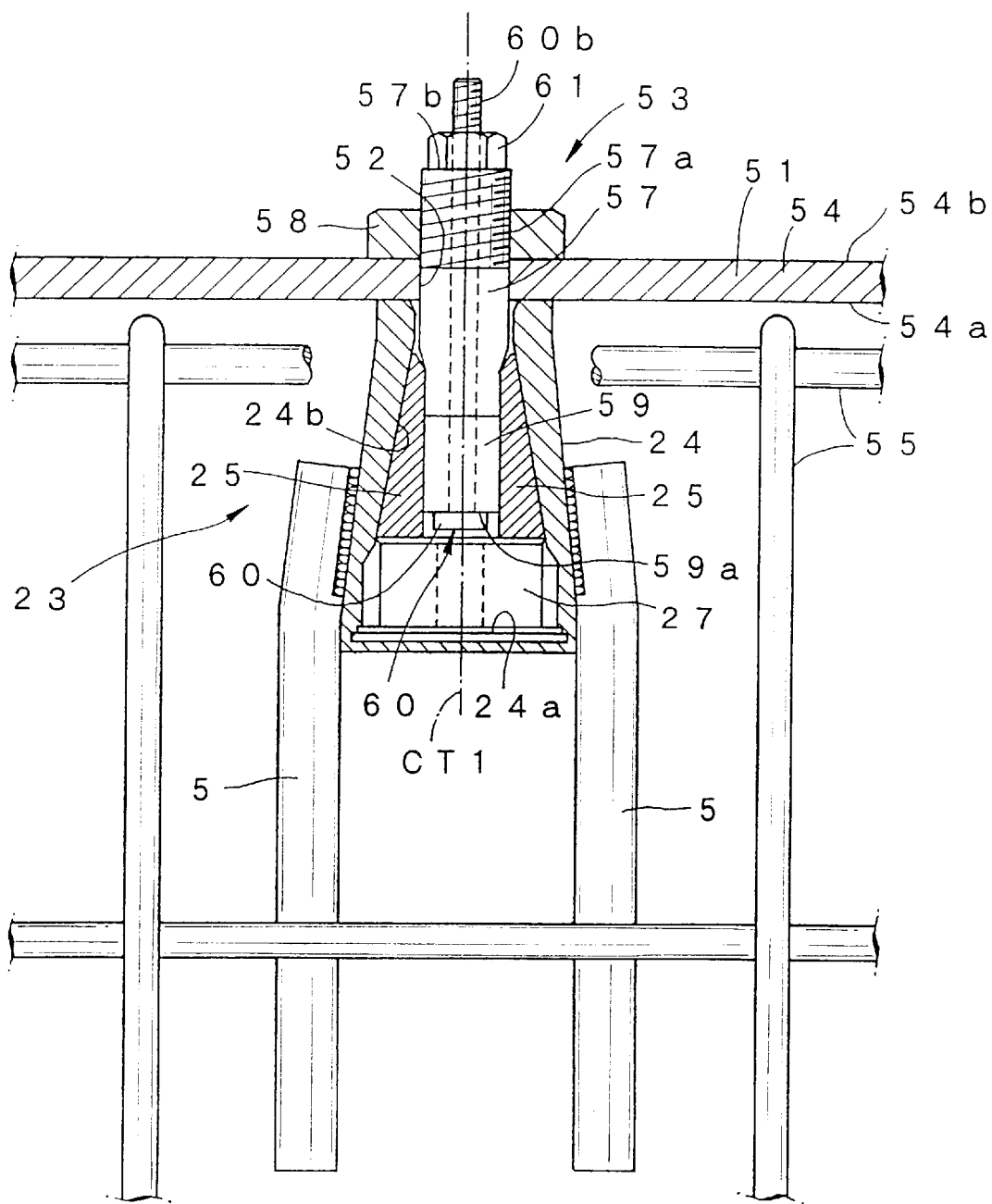
FIG. 15 is a cross-sectional view of the connector attached to the mold-plate for explaining the structure for attaching the connector to the mold-plate.

In FIG. 15, numeral 51 is a mold-plate for molding structural member 21. An attachment hole 52 is formed passing through mold-plate 51. Attaching member 53 attaches connector 23 to the area around attachment hole 52 at inner surface 54*a* of side plate 54 of mold-plate 51.

The axes of attaching member 53 and connector 23 attached to attaching member 53 coincide with axis CT1 of attachment hole 52.

Note that the connector 23 in this example has a cylindrical sleeve 24 which has a bottom. A elastic member 27 is disposed to the bottom 24*a* of sleeve 24.

A horizontal and vertical reinforcing arrangement 55 is disposed to the inner portion of mold-plate 51. An anchor 5 is weld-fixed to the outer circumference of sleeve 24 of connector 23. Anchor 5 is wrapped by reinforcing arrangement 55.

Attaching member 53 has a cylindrical pin 57 which is inserted into and engages with insertion fixing hole H of the wedges 25 inside connector 23 by inserting through attachment hole 52 of side plate 54 of mold-plate 51. Stopping members 58 are provided to cylindrical pin 57 for stopping at the outer surface 54*b* of side plate 54 of mold-plate 51. A cylindrical elastic member 59 capable of elastic deformation is provided to the end of cylindrical pin 57 on its connector 23 side. Attachment bolt 60 is provided to cylindrical pin 57 passing through the internal portion thereof. The head portion 60*a* of attachment bolt 60 is stopped by end surface 59*a* of elastic member 59. Attachment nut 61 is provided by screw-attachment to the end portion 60*b* of attachment bolt 60.

Cylindrical pin 57 is formed so as to engage with attachment hole 52 at the side plate 54 of mold-plate 51. As a result, it is simple to align attaching member 53 and connector 23.

Stopping member 58 is a tightening nut which is screwed on to cylindrical pin 57. Namely, male screw 57*a* is formed to the outer circumferential surface of the end of cylindrical pin 57. Stopping member 58, which is a tightening nut, is screwed on to male screw 57a to be freely moveable along axis CT1, stopping member 58 coming into contact with the outer surface 54b of side plate 54 of mold-plate 51.

Note that it is not absolutely essential that stopping member 58 be a tightening nut. Rather, stopping member 58 may also be a circular member fixed to cylindrical pin 57, for example.

Elastic member 59 may consist of any type of material, provided that it is capable of elastic deformation. In the discussion here, a rubber material is employed.

Attachment nut 61 is screwed on to the end 60b of attachment bolt 60 so as to be freely moveable along the direction of axis CT1, attachment nut 61 coming into contact with end surface 57b of cylindrical pin 57.

Attaching member 53 has the structure described above. Accordingly, as described below, the attachment and release of connector 23 to and from mold-plate 51 can be carried out easily and quickly.

Namely, connector 23 is disposed to the area around attachment hole 52 at the inner surface 54a of side plate 54 of mold-plate 51 with its end in contact with inner surface 54a and its axis coinciding with axis CT1 of attachment hole 52.

Next, attaching member 53 is disposed to the area around attachment hole 52 at outer surface 54b of side plate 54 of mold-plate 51. Elastic body 59 and cylindrical pin 57 are inserted into connector 23 via attachment hole 52 of mold-plate 51. Stopping member 58 is designed to be stopped by coming into contact with outer surface 54b of side plate 54 of mold-plate 51. In this case, since cylindrical pin 57 engages with attachment hole 52 without any space therebetween, the axis of cylindrical pin 57 coincides with axis CT1. As a result, the axis of connector 23 into which cyclindrical pin 57 and elastic member 59 have been inserted also coincides with axis CT1 of attachment hole 52. Thus, alignment of connector 23 can be carried out easily.

Next, attachment nut 61 is fastened on the cylindrical pin 57 side. In this way, head portion 60a of attachment bolt 60 which has stopped end surface 59a of elastic member 59 is drawn close to the cylindrical pin 57 side. As a result, elastic member 59 is compressed, undergoing elastic deformation to become flatter. The diameter of elastic member 59 widens as a result. The widened elastic member 59 uniformly presses the inner circumferential surface of the plurality of wedges 25 in connector 23. As a result, connector 23 is fixed in place to attaching member 53 with its axis coinciding with axis CT1. In addition, attaching member 53 and connector 23 sandwich lateral plate 54 of mold-plate 51 therebetween, thus serving to fix mold-plate 51 as well.

In this way, connector 23 is disposed and fixed in place within mold-plate 51. In order to further secure fixing in this case, however, stopping member 58 consisting of the tightening nut is fastened on the mold-plate 51 side. As a result, connector 23 is drawn close to inner surface 54a of side plate 54 of mold-plate 51 and tightly affixed, thereby securing the fixing thereof.

By pouring and hardening concrete on the inner side of mold-plate 51 in this state, a structural member 21 in which connector 23 is provided at a specific position can be produced.

In this way, attaching member 53 is employed to attach connector 23 to mold-plate 51 by means of a simple operation in which cylindrical pin 57 and elastic member 59 are inserted into connector 23 via attachment hole 52 of mold-plate 51, and attachment nut 61 is tightened. Thus, it is possible to simplify and speed up the attachment operation.

It is necessary to release the connection between connector 23 and mold-plate 51 when removing the mold. In this case, by loosening attachment nut 61, the pressing force of head portion 60a of attachment bolt 60 on elastic member 59 is released. As a result, elastic member 59 returns to its original form, releasing the engagement between connector 23 and attaching member 53. As a result, the connection between connector 23 and mold-plate 51 is released. Accordingly, removal of connector 23 from mold-plate 51 can also be carried out easily and quickly.

Figure 16:
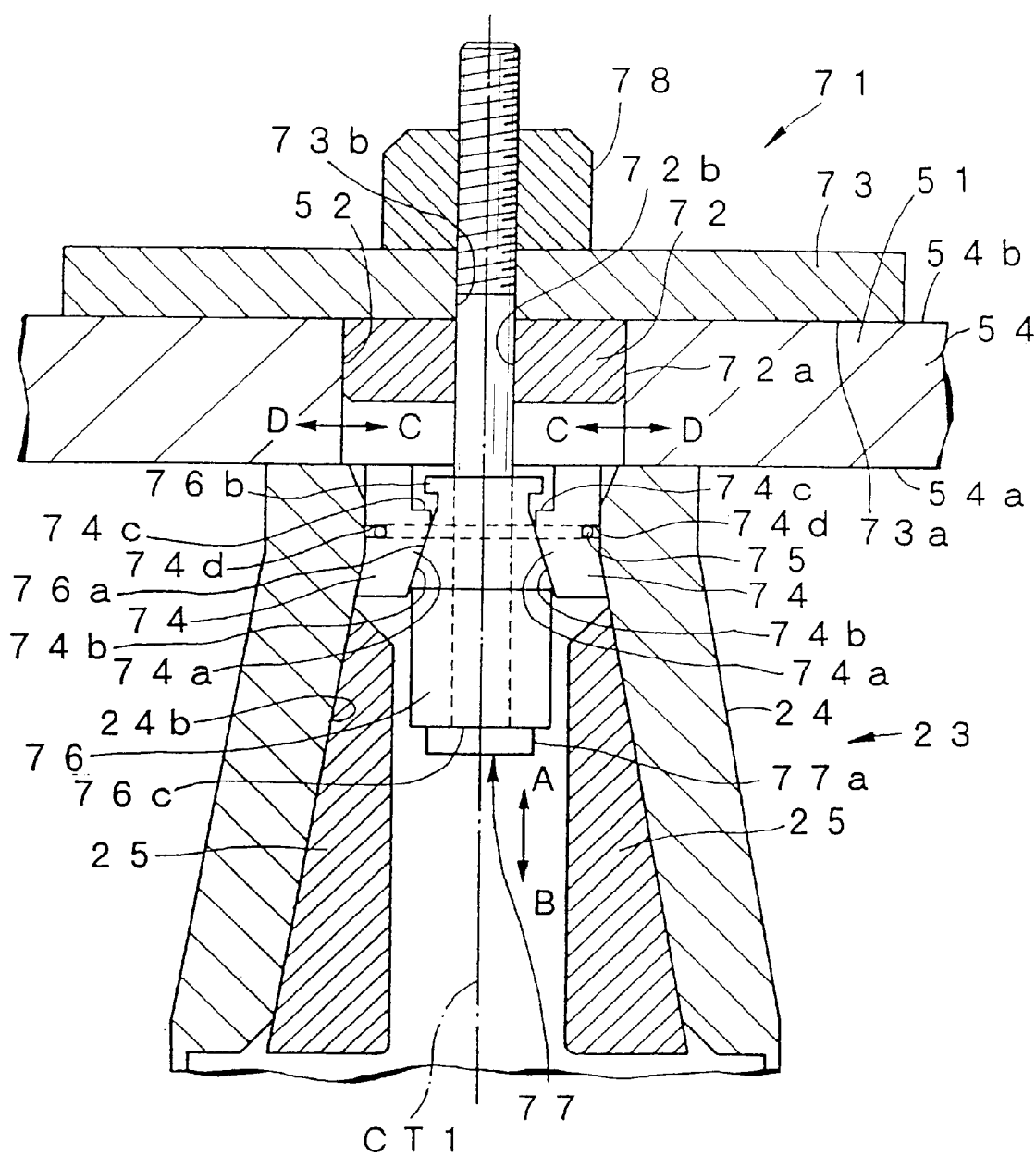
FIG. 16 is a cross-sectional view of the connector attached to the mold-plate, for explaining another example of the structure for attaching the connector to the mold-plate.

FIG. 16 shows an example of the attachment of connector 23 to a specific position on mold-plate 51 employing another attaching member 71.

This attaching member 71 has an engaging portion 72 which inserts into and engages with attachment hole 52 of side plate 54 of mold-plate 51. Engaging portion 72 is formed as a circular disk, with its circumferential wall 72a contacting attachment hole 52. A plate-shaped stopping member 73 is provided fixed to the outer surface 54b side of side plate 54. Surface 73a on the side plate 54 side of stopping member 73 is stopped by outer surface 54b of side plate 54. Passage holes 72b, 73b formed centered on axis CT1 of attachment hole 52 are formed to engaging member 72 and stopping member 73, respectively.

Connector 23 is disposed to the inner surface 54a of side plate 54 of mold-plate 51. A plurality of wide-diameter pieces 74 are disposed to the open end of tapered inner circumferential wall 24b of sleeve 24 of connector 23. These wide-diameter pieces 74 have respective projections 74a projecting toward the axis CT1 side. The surface of each wide projection 74a on the axis CT1 side forms a tapered surface 74b which gradually approaches axis CT1 as the open end of sleeve 24 is approached.

Stopping surfaces 74c are formed to the open end side of sleeve 24 of each projection 74a. Stopping surfaces 74c are formed at right angles with respect to axis CT1. Mutually communicating grooves 74d are provided to the outer circumferential surface of wide-diameter pieces 74 centered on axis CT1.

Ring-type springs 75 engage with grooves 74d in the plurality of wide-diameter pieces 74 as a biasing means for biasing these wide-diameter pieces 74 toward axis CT1.

Approximately cylindrical wide-diameter piece manipulating member 76 is disposed between the plurality of wide-diameter pieces 74. A tapered surface 76a is formed to the top part of wide-diameter piece manipulating member 76. This tapered surface 76a is designed to come in contact with the tapered surface 74b of wide-diameter piece 74. Wide-diameter piece manipulating member 76 moves toward attachment hole 52 along axis CT1, so that wide-diameter pieces 74 are moved apart from one another. Conversely, when wide-diameter piece manipulating member 76 moves along axis CT1 in the direction away from attachment hole 52, wide-diameter pieces 74 come into contact with one another due to the biasing force of ring-shaped spring 75.

Engaging portion 76b is formed in a circle projecting outward at the upper end of wide-diameter piece manipulating member 76, this engaging portion 76b engaging with engaging surfaces 74c of projections 74a of wide-diameter pieces 74 when wide-diameter pieces 74 are close together.

Attachment bolt 77 is provided passing through the inside of wide-diameter piece manipulating member 76. The head portion 77a of attachment bolt 77 is stopped by the end surface 76c of wide-diameter piece manipulating member 76. In addition, attachment bolt 77 is inserted into passage hole 72b of engaging portion 72 and passage hole 73b of stopping member 73. Attachment nut 78 is screwed on to the end portion of attachment bolt 77, with attachment nut 78 coming into contact with stopping member 73.

Because attaching member 71 and the like are designed as described above, the attachment and removal of connector 23 to and from mold-plate 51 can be carried out easily and quickly.

Namely, the open end side of connector 23 is brought into contact with the inner surface 54a of side plate 54 of mold-plate 51 while being made to coincide with axis CT1 of attachment hole 52.

Next, attaching member 71 is disposed to the area around attachment hole 52 at outer surface 54b of side plate 54 of mold-plate 51. Wide-diameter piece manipulating member 76 and wide-diameter pieces 74 of attaching member 71 are inserted into connector 23 after passing through attachment hole 52 of mold-plate 51.

In this case wide-diameter pieces 74 are brought close together in the direction indicated by arrows C in the figure due to the biasing force of ring-shaped springs 75. For this reason, the outer diameter of wide-diameter pieces 74 is smaller than the diameter of the open end portion of inner circumferential wall 24b of sleeve 24 of connector 23.

Accordingly, wide-diameter pieces 74 and wide-diameter piece manipulating member 76 can be inserted inside sleeve 24.

When wide-diameter pieces 74 and wide-diameter piece manipulating member 76 are inserted into sleeve 24, stopping member 73 comes into contact with outer surface 54b of side plate 54 of mold-plate 51 and is stopped.

Because engaging member 72 engages with attachment hole 52 in this case, the axis thereof coincides with axis CT1 of attachment hole 52.

Attachment nut 78 is fastened on the stopping member 73 side. As a result, attachment bolt. 77, which stops wide-diameter piece manipulating member 76, is brought close to the attachment hole 52 side, so that wide-diameter piece manipulating member 76 moves to the attachment hole 52 side.

The outer circumferential surfaces of wide-diameter pieces 74 disposed around wide-diameter piece manipulating member 76 are in contact with tapered inner circumferential wall 24b of sleeve 24 in connector 23. Due to frictional force, wide-diameter pieces 74 are moved in a direction (i.e., the direction indicated by arrow B in the figure) which is relatively opposite the direction (i.e., the direction indicated by arrow A in the figure) in which wide-diameter piece manipulating member 76 moves.

As a result, tapered surface 76a of wide-diameter piece manipulating member 76 slides in the direction indicated by arrow A relative to tapered surface 74b of wide-diameter piece 74. Thus, wide-diameter pieces 74 are pushed apart from one another by tapered surface 76a of wide-diameter piece manipulating member 76. In other words, the outer diameter of wide-diameter pieces 74 becomes greater.

By increasing the outer diameter of wide-diameter pieces 74 in this way, wide-diameter pieces 74 are more strongly pressed against inner circumferential wall 24b of sleeve 24 of connector 23. As a result, connector 23 is fixed in place by attaching member 71.

When wide-diameter pieces 74 are fixed in place by connector 23, wide-diameter piece manipulating member 76 is stopped by connector 23 via wide-diameter pieces 74. Thus, when attachment nut 78 is fastened, side plate 54 of mold-plate 51 is sandwiched in the space between connector 23 and stopping member 73 of attaching member 71.

By pouring and hardening concrete inside mold-plate 51 in this state, a structural member 21 in which connector 23 is provided at a specific position can be produced.

Thus, connector 23 is also fixed to mold-plate 51. In this case, the axis of connector 23 can be made to coincide with the axis CT1 of attachment hole 52. As a result, alignment can be carried out conveniently and with high accuracy.

Accordingly, attaching member 71 can attach connector 23 to mold-plate 51 by means of a-simple operation in which the wide-diameter pieces 74 and wide-diameter piece manipulating member 76 are inserted into connector 23 by passing through attachment hole 52 of mold-plate 51 and fastening attachment nut 78. Thus, the attachment operation can be done more easily and quickly.

The connection between connector 23 and mold-plate 51 must be released when releasing the mold. The pressing force of wide-diameter piece manipulating member 76 on wide-diameter pieces 74 can be released by loosening attachment nut 78 and moving wide-diameter piece manipulating member 76 in the direction indicated by arrow B in the figure.

In this way, wide-diameter pieces 74 are drawn together by ring-shaped spring 75, so that the engagement between connector 23 and attaching member 7 is freed. As a result, the connection between connector 23 and mold-plate 51 is released. Accordingly, the release of connector 23 from mold-plate 51 can also be carried out easily and quickly.

Using attaching member 71 as described above, the formation of a structural member 21 in which a connector 23 is provided can be carried out easily and quickly.

Next, another example will be explained in which connector 23 is supported by a mold-plate when forming a structural member 21 having a connector 23.

Figure 17:
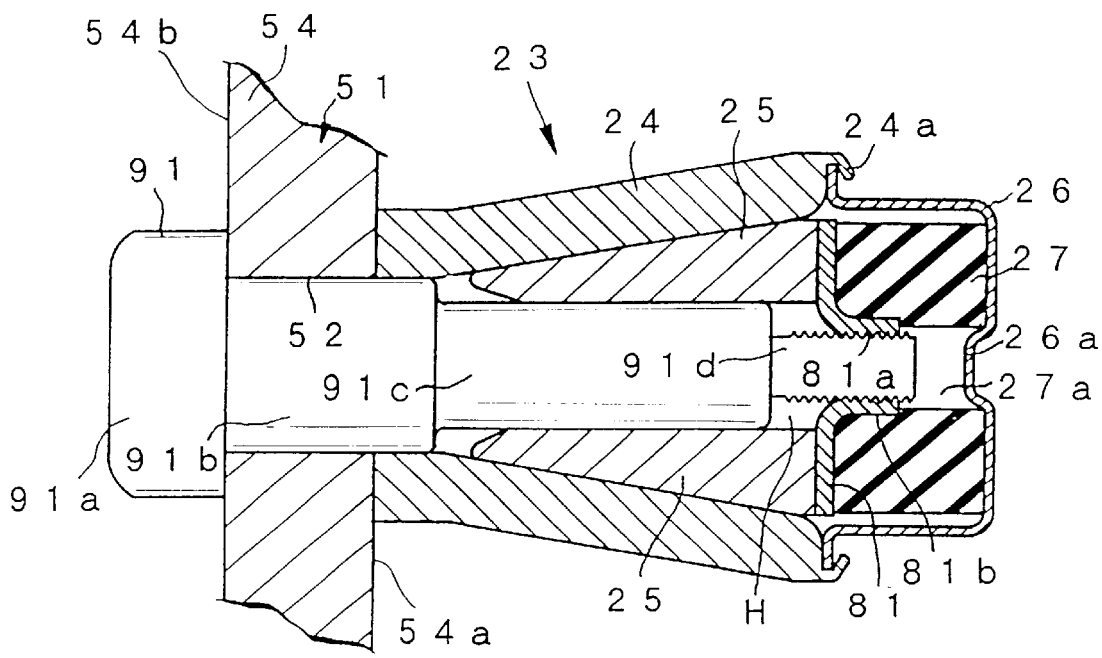
FIG. 17 is a cross-sectional view of the connector attached to the mold-plate, for explaining another example of the structure for attaching the connector to the mold-plate.

As shown in FIG. 17, in this example, a retainer 81 having a screw hole 81a is provided to connector 23 in between wedges 25 and urethane spring 27. In this retainer 81, screw hole 81a communicates with insertion fixing hole H formed by wedges 25.

Screw hole 81a of retainer 81 is formed to projection 81b which engages with center hole 27a of urethane spring 27.

Note that the ends of urethane spring 27 housed inside spring holding member 26 may be attached to spring holding member 26 and retainer 81 by means of an adhesive agent.

When attaching connector 23 to mold-plate 51, attachment bolt 91 is inserted into insertion fixing hole H of connector 23 via attachment hole 52 which is formed in mold-plate 51, and screwed into screw hole 81a of retainer 81, bringing the open end of sleeve 24 into contact with the inner surface 54a of mold-plate 51.

Attachment bolt 91 has a head portion 91a which has a diameter which is larger than that of attachment hole 52 of mold-plate 51. In addition, attachment bolt 91 has a neck portion 91b which is formed to have almost the same diameter as the diameter of the opening at the end of sleeve 24 and attachment hole 52 of mold-plate 51. An axis 91c which is narrower than neck portion 91b is formed at the tip of neck portion 91b. A screw portion 91d which is narrower than axis 91c and directly screws together into screw hole 81a of retainer 81 is formed to the end of axis 91c.

When screw portion 91d of attachment bolt 91 is screwed into screw hole 81a of retainer 81 in connector 23, wedges 25 are drawn closer to the open end of sleeve 24 by retainer 81. As a result, wedges 25 are pressed against the outer circumferential surface of axis 91c of attachment bolt 91, fixing connector 23 to attachment bolt 91.

In this state, concrete is poured into mold-plate 51 and hardened, thereby forming a structural member 21 in which connector 23 is provided at a specific position.

In attachment bolt 91, neck portion 91b is tightly inserted into attaching hole 52 of mold-plate 51 and sleeve 24 of connector 23. As a result, connector 23 can be attached to a specific position on mold-plate 51 in a specific state.

Attachment bolt 91 of course must be pulled out of the loose connector 23 when releasing the mold once the poured concrete has hardened.

Figure 18:
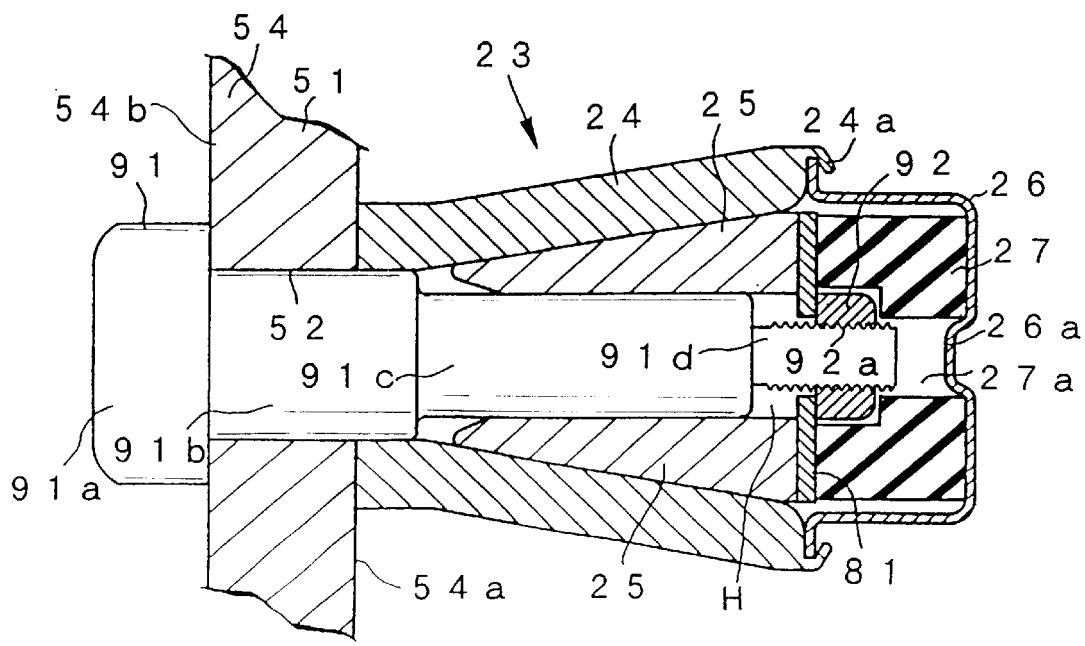
FIG. 18 is a cross-sectional view of the connector attached to the mold-plate, for explaining another example of the structure for attaching the connector to the mold-plate.

FIG. 18 shows another method for attaching connector 23 to mold-plate 51. In the connector 23 of this example, a nut 92 in which a screw hole 92a is formed is provided to retainer 81. Typically, nut 92 is attached in a unitary manner to retainer 81 by means of welding or adhesion. However, it may also be disposed by engagement between retainer 81 and urethane spring 27 to prevent free rotation.

Note that the shape of attachment bolt 91 in this example is not limited to that described above. Rather, the shape of attachment bolt 91 may be changed in various ways in response to the structure of connector 23.

INDUSTRIAL FIELD OF APPLICATION

As described above, the present invention's connecting structure enables extremely easy and sure connection of structural members, even if there is a slight positional deviation between the structural members to be connected.

What is claimed is:

1. A wedge production method for producing wedges for a connector provided with:
   a tapered sleeve, the inner circumferential surface of which has a gradually widening diameter in the direction of insertion of said connecting rod;
   a plurality of wedges that are disposed in a circle within the sleeve to form an insertion fixing hole at their mutual center, this plurality of wedges being disposed so as to be freely moveable along the longitudinal direction of the sleeve with their outer circumferential surfaces in contact with the inner circumferential surface of the sleeve; and
   an elastic member for biasing said wedges toward the rear direction of insertion of the connecting rod which is inserted into said insertion fixing hole; wherein,
   a plurality of intermediate work pieces, which are flabellate in cross-section, are produced and then placed in a forging machine disposed in a circle with their lateral surfaces facing one another, and the intermediate work pieces are simultaneously forge-molded into wedges by the forging machine to produce the wedges which form said connector.

2. A wedge production method according to claim 1, wherein said intermediate product is molded by forging.

3. A wedge production method according to claim 1, wherein a symbol indicating the arrangement of the plurality of wedges is stamped on the end surface of the wide diameter side of each wedge during simultaneous forging of the plurality of wedges.

4. A connector attaching structure for using an attaching member to attach to a mold-plate a connector provided with:
   a tapered sleeve, the inner circumferential surface of which has a gradually widening diameter in the direction of insertion of a connecting rod;
   a plurality of wedges that are disposed in a circle within the sleeve to form an insertion fixing hole at their mutual center, this plurality of wedges being disposed so as to be freely moveable along the longitudinal direction of said sleeve with their outer circumferential surfaces in contact with the inner circumferential surface of the sleeve; and
   an elastic member for biasing said wedges toward the rear direction of insertion of said connecting rod which is inserted into said insertion fixing hole; said attaching member being provided with:
   a cylindrical pin which passes through the attachment hole formed in said mold-plate, to insert into and engage with said insertion fixing hole of said connector disposed at the inner surface of said mold-plate;
   a stopping member provided to said cylindrical pin, which is stopped by the outer surface of said mold-plate;
   an elastically deformable elastic member which is provided to the end of said cylindrical pin on said connector side;
   an attachment bolt which passes through said elastic member and said cylindrical pin, the head of which is stopped by said elastic member; and
   an attachment nut which screws onto the end of said attachment bolt which projects outward from the end of said cylindrical pin; wherein,
   said attaching member attaches said connector to said mold-plate by screwing on said attachment nut of said attaching member, causing said elastic member to be compressed so that its diameter expands.

5. A connector attaching structure according to claim 4, wherein said stopping member is a tightening nut which screw-attaches to said cylindrical pin.

6. A connector attaching structure for using an attaching member to attach to a mold-plate a connector provided with:
   a tapered sleeve, the inner circumferential surface of which has a gradually widening diameter in the direction of insertion of said connecting rod;
   a plurality of wedges that are disposed in a circle within said sleeve to form an insertion fixing hole at their mutual center, this plurality of wedges being disposed so as to be freely moveable along the longitudinal direction of said sleeve with their outer circumferential surfaces in contact with the inner circumferential surface of said sleeve; and
   an elastic member for biasing said wedges toward the rear direction of insertion of the connecting rod which is inserted into said insertion fixing hole; said attaching member being provided with:
   an engaging portion that inserts into and engages with the attaching hole of said mold-plate;
   a stopping member provided to said engaging portion, which is stopped by the outer surface of said mold-plate;
   a plurality of wide-diameter pieces disposed in opposition to one another at the open end of the inner circumferential wall of the sleeve of said connector, sandwiching the axis of said connector therebetween;
   a biasing means for biasing said plurality of wide-diameter pieces along said axis;
   a wide-diameter piece manipulating member provided with a tapered surface disposed in between said plurality of wide-diameter pieces, for mutually separating said plurality of wide-diameter pieces accompanying relative movement toward said attachment hole, and mutually bringing together said wide-diameter pieces under the biasing force of said biasing means accompanying relative movement in the opposite direction, and an interlocking member for interlocking with said wide-diameter pieces when they have been brought mutually close together and moving them in the opposite direction;

an attachment bolt which passes through said wide-diameter piece manipulating member, said engaging portion and said stopping member, the head of which is stopped by said wide-diameter piece manipulating member; and an attachment nut which screws onto the end of said attachment bolt which projects outward from the end of said stopping member; wherein, said attaching member attaches said connector to said mold-plate by screwing on said attachment nut of said attaching member, causing said wide-diameter pieces to be compressed in the outer circumferential direction by said wide-diameter manipulating member.

7. A connector attaching structure for attaching to a mold-plate a connector provided with:

a tapered sleeve, the inner circumferential surface of which has a gradually widening diameter in the direction of insertion of said connecting rod;

a plurality of wedges that are disposed in a circle within said sleeve to form an insertion fixing hole at their mutual center, said plurality of wedges being disposed so as to be freely moveable along the longitudinal direction of said sleeve with their outer circumferential surfaces in contact with the inner circumferential surface of said sleeve; and an elastic member for biasing said wedges toward the rear direction of insertion of the connecting rod which is inserted into said insertion fixing hole; wherein, a retainer having a screw hole is provided in between said wedges and said elastic member of said connector, with the screw hole communicating with said insertion fixing hole; and said connector is attached to said mold-plate by inserting the attachment bolt which has been inserted through the attachment hole of said mold-plate into said insertion fixing hole, and screwing said attachment bolt into the screw hole of said retainer.

8. A connector attaching structure for attaching to a mold-plate a connector provided with:

a tapered sleeve, the inner circumferential surface of which has a gradually widening diameter in the direction of insertion of said connecting rod;

a plurality of wedges that are disposed in a circle within said sleeve to form an insertion fixing hole at their mutual center, this plurality of wedges being disposed so as to be freely moveable along the longitudinal direction of said sleeve with their outer circumferential surfaces in contact with the inner circumferential surface of said sleeve; and an elastic member for biasing said wedges toward the rear direction of insertion of the connecting rod which is inserted into said insertion fixing hole; wherein, a retainer is provided in between said wedges and said elastic member of said connector, said retainer being provided with a nut having a screw hole; and said connector is attached to said mold-plate by inserting the attachment bolt through the attachment hole of said mold-plate into said insertion fixing hole, and screwing said nut into said screw hole.

* * * * *